(12) United States Patent
Krumm et al.

(10) Patent No.: US 8,024,112 B2
(45) Date of Patent: Sep. 20, 2011

(54) METHODS FOR PREDICTING DESTINATIONS FROM PARTIAL TRAJECTORIES EMPLOYING OPEN-AND CLOSED-WORLD MODELING METHODS

(75) Inventors: John C. Krumm, Redmond, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1346 days.

(21) Appl. No.: 11/426,540

(22) Filed: Jun. 26, 2006

(65) Prior Publication Data
US 2007/0073477 A1 Mar. 29, 2007

Related U.S. Application Data

(60) Provisional application No. 60/721,879, filed on Sep. 29, 2005.

(51) Int. Cl.
*G01C 21/30* (2006.01)
*G01C 21/32* (2006.01)
(52) U.S. Cl. ...... 701/209; 701/208; 340/990; 340/995.1
(58) Field of Classification Search .......... 701/117–118, 701/201, 211, 213, 208–209; 340/989, 990, 340/994, 995.1, 995.23, 995.28; 707/999.01; 709/217; 382/101–102, 1; 455/414.2; 342/357.46
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,948,040 A * | 9/1999 | DeLorme et al. | 701/201 |
| 5,978,732 A * | 11/1999 | Kakitani et al. | 701/209 |

(Continued)

FOREIGN PATENT DOCUMENTS

DE 10042983 A1 3/2002

(Continued)

OTHER PUBLICATIONS

Predestination: Where Do You Want to Go Today? Krumm, J.; Horvitz, E.; Computer vol. 40, Issue: 4; Digital Object Identifier: 10.1109/MC.2007.141; Publication Year: 2007, pp. 105-107.*

(Continued)

*Primary Examiner* — Cuong H Nguyen
(74) *Attorney, Agent, or Firm* — Wolf, Greenfield & Sacks, P.C.

(57) ABSTRACT

The claimed subject matter provides systems and/or methods that facilitate inferring probability distributions over the destinations and/or routes of a user, from observations about context and partial trajectories of a trip. Destinations of a trip are based on at least one of a prior and a likelihood based at least in part on the received input data. The destination estimator component can use one or more of a personal destinations prior, time of day and day of week, a ground cover prior, driving efficiency associated with candidate locations, and a trip time likelihood to probabilistically predict the destination. In addition, data gathered from a population about the likelihood of visiting previously unvisited locations and the spatial configuration of such locations may be used to enhance the predictions of destinations and routes.

17 Claims, 20 Drawing Sheets

U.S. PATENT DOCUMENTS

| | | | |
|---|---|---|---|
| 6,122,572 A * | 9/2000 | Yavnai | 701/23 |
| 6,353,398 B1 | 3/2002 | Amin et al. | |
| 6,466,232 B1 | 10/2002 | Newell et al. | |
| 6,480,783 B1 * | 11/2002 | Myr | 701/117 |
| 6,513,046 B1 | 1/2003 | Abbott, III et al. | |
| 6,549,915 B2 | 4/2003 | Abbott, III et al. | |
| 6,574,351 B1 * | 6/2003 | Miyano | 382/101 |
| 6,615,130 B2 * | 9/2003 | Myr | 701/117 |
| 6,672,506 B2 | 1/2004 | Swartz et al. | |
| 6,741,188 B1 | 5/2004 | Miller et al. | |
| 6,747,675 B1 | 6/2004 | Abbott et al. | |
| D494,584 S | 8/2004 | Schlieffers et al. | |
| 6,791,580 B1 | 9/2004 | Abbott et al. | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,837,436 B2 | 1/2005 | Swartz et al. | |
| 6,842,877 B2 | 1/2005 | Robarts et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,171,378 B2 | 1/2007 | Petrovich et al. | |
| 7,195,157 B2 | 3/2007 | Swartz et al. | |
| 7,233,861 B2 * | 6/2007 | Van Buer et al. | 701/209 |
| 7,385,501 B2 | 6/2008 | Miller et al. | |
| 7,512,462 B2 * | 3/2009 | Nichols et al. | 701/3 |
| 7,590,589 B2 * | 9/2009 | Hoffberg | 705/37 |
| 7,617,042 B2 * | 11/2009 | Horvitz et al. | 701/200 |
| 7,630,986 B1 * | 12/2009 | Herz et al. | 1/1 |
| 7,813,870 B2 * | 10/2010 | Downs et al. | 701/117 |
| 7,899,611 B2 * | 3/2011 | Downs et al. | 701/117 |
| 7,912,628 B2 * | 3/2011 | Chapman et al. | 701/117 |
| 2001/0029425 A1 * | 10/2001 | Myr | 701/200 |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0154476 A1 | 8/2003 | Abbott, III et al. | |
| 2004/0068364 A1 * | 4/2004 | Zhao et al. | 701/201 |
| 2004/0201500 A1 | 10/2004 | Miller et al. | |
| 2005/0034078 A1 | 2/2005 | Abbott et al. | |
| 2005/0228553 A1 * | 10/2005 | Tryon | 701/22 |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0241862 A1 * | 10/2006 | Ichihara et al. | 701/209 |
| 2008/0090591 A1 | 4/2008 | Miller et al. | |
| 2008/0091537 A1 | 4/2008 | Miller et al. | |
| 2008/0161018 A1 | 7/2008 | Miller et al. | |

FOREIGN PATENT DOCUMENTS

| | | |
|---|---|---|
| JP | 2007-083678 | 3/1995 |
| JP | 2008-271277 | 10/1996 |
| JP | 10132593 A | 5/1998 |
| JP | 2011-153446 | 8/1999 |
| JP | 2002-328035 | 11/2002 |
| JP | 16317160 A | 11/2004 |
| KR | 19970071404 A | 11/1997 |
| KR | 20040033141 A | 4/2004 |
| KR | 20040050550 A | 6/2004 |
| RU | 8141 | 10/1998 |
| WO | 9800787 | 1/1998 |

OTHER PUBLICATIONS

Will Mobile Computing's Future Be Location, Location, Location? ; Vaughan-Nichols, S.J.; Computer; vol. 42 , Issue: 2 Digital Object Identifier: 10.1109/MC.2009.65; Publication Year: 2009 , pp. 14 -17.*

Design of a Car Navigation System that Predicts User Destination; Terada, T.; Miyamae, M.; Kishino, Y.; Tanaka, K.; Nishio, S.; Nakagawa, T.; Yamaguchi, Y.; Mobile Data Management, 2006. MDM 2006. 7th International Conference on; Digital Object Identifier: 10.1109/MDM.2006.67; Publication Year: 2006 , pp. 145-145.*

A Map Matching Algorithm for Car Navigation Systems that Predict User Destination; Miyashita, K.; Terada, T.; Nishio, S.; Advanced Information Networking and Applications—Workshops, 2008. AINAW 2008. 22nd International Conference on Digital Object Identifier: 10.1109/WAINA.2008.242; Publication Year: 2008 ,pp. 1551-1556.*

Remaining Delivery Time Estimation Based Routing for Intermittently Connected Mobile Networks; Feng Liu; Ming Li; Run Zhang; He Zhang; Zhen Xu; Distributed Computing Systems Workshops, 2008. ICDCS '08. 28th International Conference on Digital Object Identifier: 10.1109/ICDCS.Workshops.2008.90; Publication Year: 2008 , pp. 222-227.*

A dynamic navigation scheme for vehicular ad hoc networks; Yan-Jing Wu; Wei-Cheng Sung; Networked Computing and Advanced Information Management (NCM), 2010 Sixth International Conference on; Publication Year: 2010 , pp. 231-235.*

Development of Freeway Travel Time Forecasting Models by Integrating Different Sources of Traffic Data; Chien-Hung Wei; Ying Lee; Vehicular Technology, IEEE Transactions on; vol. 56 , Issue: 6 , Part: 2; Digital Object Identifier: 10.1109/TVT.2007.901965; Publication Year: 2007 , pp. 3682-3694.*

Learning to Predict Driver Route and Destination Intent; Simmons, R.; Browning, B.; Yilu Zhang; Sadekar, V.; Intelligent Transportation Systems Conference, 2006. ITSC '06. IEEE; Digital Object Identifier: 10.1109/ITSC .2006.1706730 Publication Year: 2006 , pp. 127-132.*

Development of Navigation System for Autonomous Vehicle to Meet the DARPA Urban Grand Challenge; Xie, M.; Chen, H.; Zhang, X.F.; Guo, X.; Yu, Z.P.; Intelligent Transportation Systems Conference, 2007. ITSC 2007. IEEE; Digital Object Identifier: 10.1109/ITCS. 2007.4357742; Publication Year: 2007 , pp. 767-772.*

Performance evaluation of traffic control based on geographical information; Jae-Hyeong Choi; Ki-Il Kim; Intelligent Computing and Intelligent Systems, 2009. ICIS 2009. IEEE International Conference on; vol. 3; Digital Object Identifier: 10.1109/ICICISYS. 2009.5358239; Publication Year: 2009 , pp. 85-89.*

Design and implementation of a movement history analysis framework for the Taxi telematics system; Junghoon Lee; Gyung-Leen Park; Communications, 2008. APCC 2008. 14th Asia-Pacific Conference on; Publication Year: 2008 , pp. 1-4.*

Cell-based traffic estimation from multiple GPS-equipped cars; Sananmongkhonchai, S.; Tangamchit, P.; Pongpaibool, P.; Tencon 2009-2009 IEEE Region 10 Conference; Digital Object Identifier: 10.1109/TENCON.2009.5395897 Publication Year: 2009 , pp. 1-6.*

Travel destination prediction using frequent crossing pattern from driving history; Kostov, V.; Ozawa, J.; Yoshioka, M.; Kudoh, T.; Intelligent Transportation Systems, 2005. Proceedings. 2005 IEEE; Digital Object Identifier: 10.1109/ITSC.2005.1520182 Publication Year: 2005 , pp. 343-350.*

Estimating positions and paths of moving objects; Beard, K.; Palancioglu, H.M.; Temporal Representation and Reasoning, 2000. TIME 2000. Proceedings. Seventh International Workshop on; Digital Object Identifier: 10.1109/TIME.2000.856597 Publication Year: 2000 , pp. 155-162.*

Predict Personal Continuous Route; Qian Ye; Ling Chen; Gencai Chen; Intelligent Transportation Systems, 2008. ITSC 2008. 11th International IEEE Conference on; Digital Object Identifier: 10.1109/ITSC.2008.4732585; Publication Year: 2008 , pp. 587-592.*

International Search Report completed and mailed Dec. 12, 2008 for PCT Application Serial No. PCT/US2008/67808, 8 Pages.

International Search Report dated Jan. 15, 2007 for PCT Application Serial No. PCT/US2006/034608, 3 Pages.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, in Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May, 1998, 48 pages.
Mark Weiser, The Computer for the 21st Century, Scientific American, Sep. 1991, 8 pages.
T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
JP Office Action dated May 31, 2011.

* cited by examiner

METHODS FOR PREDICTING DESTINATIONS FROM PARTIAL TRAJECTORIES EMPLOYING OPEN-AND CLOSED-WORLD MODELING METHODS

CROSS-REFERENCE TO RELATED APPLICATIONS

This application claims the benefit of U.S. Provisional Application Ser. No. 60/721,879 filed on Sep. 29, 2005, and entitled PREDESTINATION. The entirety of the aforementioned application is incorporated herein by reference.

BACKGROUND

Location can be an important part of an individual's context. Vast amounts of information can be associated with an individual's geographic location and, if the individual is traveling, a geographic location of her destination. Conventionally, an individual traveling from one location to another location typically employs a map as a guide. However, utilization of a map can require the individual to identify a route by which to traverse from her current location to her destination. Additionally, such a traveler is typically only notified of information relevant to her current location or destination based on word of mouth, personal familiarity, etc. By way of illustration, if the traveler is in a location where she has not previously visited, she may be unaware as to the location of a gas station, a restaurant, or the like, and thus, may have to resort to asking for assistance or watching for signs along the road. By way of further illustration, the driver who uses a map may only find out about traffic congestion by listening to a radio station that provides such information.

A number of applications are commonly available that support generating a map from a starting point to a destination. For example, such applications typically can provide a user with driving directions as well as a map that depicts a route from a beginning position to a destination. By way of illustration, the user can input a starting point and an end point and the application can yield the associated driving directions and/or map(s) (e.g., highlighting a route). These applications can be utilized in connection with devices such as personal computers, laptop computers, handhelds, cell phones and the like.

Recently, Global Positioning System (GPS) devices that can determine a location associated with the device are becoming more commonly utilized. For example, GPS can be employed with a navigation system of a vehicle to provide driving directions to the vehicle's driver. Pursuant to this example, the navigation system can display a map that is updated according to the vehicle's change in position. Further, the navigation system can provide the driver with step by step directions while the vehicle is traveling (e.g., by way of a display, a speaker, . . . ). However, conventional systems employing GPS (as well as other conventional techniques) typically require the user to directly input a destination. For example, a GPS device commonly will not provide driving directions to a vehicle's driver unless the driver indicates the location of the destination. Additionally, users may not input a destination every time that they are traveling; thus, alerts associated with the destination and/or an associated route may not be provided to the users. For instance, a user may not enter a destination when traversing to a location to which she often travels such as work, home, school, etc.; accordingly, relevant alerts may not be provided to the user.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate probabilistically predicting destination(s). Input data can be obtained that can relate to a user, a user's history (e.g., historical data), disparate user's, topography of a geographical area (e.g., ground cover data), efficient routes, trip time distributions, a current trip (e.g., location, change in location, time, . . . ), etc. It is contemplated that the input data can be obtained from any source (e.g., a location component, a timer component, a data store, the Internet, . . . ). A prediction can be effectuated utilizing one or more priors and/or one or more likelihoods. For instance, the priors can be a personal destinations prior and/or a ground cover prior. Additionally, the likelihoods can be an efficient driving likelihood and/or a trip time likelihood. It is to be appreciated that one or more priors, one or more likelihoods, or a combination of priors and likelihoods can be utilized to generate the predicted destination(s).

In accordance with various aspects of the claimed subject matter, a destination estimator component can probabilistically predict a destination for a trip based on prior(s) and/or likelihood(s). The destination estimator component can be employed to select and/or combine prior(s) and/or likelihood(s) to yield the predicted destinations. According to an example, any combination of prior(s) and/or likelihoods can be employed by the destination estimator component by way of utilizing Bayes rule.

Pursuant to one or more aspects of the claimed subject matter, the destination estimator component can employ a personal destinations prior, a ground cover prior, an efficient driving likelihood, and/or a trip time likelihood. The personal destinations prior can be based on a set of a user's previous destinations; thus, historical data can be evaluated to yield the personal destinations prior. For instance, open world modeling and/or closed world modeling can be employed in connection with obtaining the personal destinations prior. Open world and/or closed world analyses can be integrated into a location forecast; thus, the analysis can include forecasting about both the likelihood of a driver visiting a previously unobserved location (as a function of an observation horizon), and the spatial relationships of new locations, given prior locations. Parameters for the open-world inference can come from the observation of multiple people over time, and then can be mapped to individuals. Also, demographic information can be considered in open-world modeling. Additionally, the ground cover prior can be based on ground cover data that provides a probability that a particular cell is the destination based on a ground cover within the particular cell. Further, the efficient driving likelihood can be based on a change in time until an arrival at a candidate destination, where it can be assumed that a traveler will continue to reduce an amount of time until arrival as the trip proceeds. For instance, a computed driving efficiency associated with each candidate destination can be utilized as evidence about a final location. The trip time likelihood can be based on a trip time distribution and/or an elapsed trip time. According to a further example, contextual features such as time of day, day of week (e.g., weekend versus weekday), holiday status, season, month of year, and so forth can be utilized as part of the analysis.

According to various aspects of the claimed subject matter, reasoning can be applied to identify destinations, routes that people will likely take on their way to the destinations, and the like. Further, applications can utilize the identified destinations and/or routes to provide relevant information to a user. According to an example, the applications can provide warnings of traffic, construction, safety issues ahead, guide advertisements being displayed, provide directions, routing advice, updates, etc. For instance, the information provided to the user can be relevant to the predicted destination(s). Additionally or alternatively, routes to the predicted destination(s) can be evaluated such that the information can be relevant to locations associated with the routes (e.g., a location traversed along the route). The relevant information can include, for instance, alerts related to traffic, navigational assistance, events, targeted advertisement, establishments, landmarks, and the like. It is to be appreciated that the relevant information can be delivered in any manner (e.g., by way of audio signal, visual information, . . . ). Further, the information that is presented can be customized based upon user related preferences.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
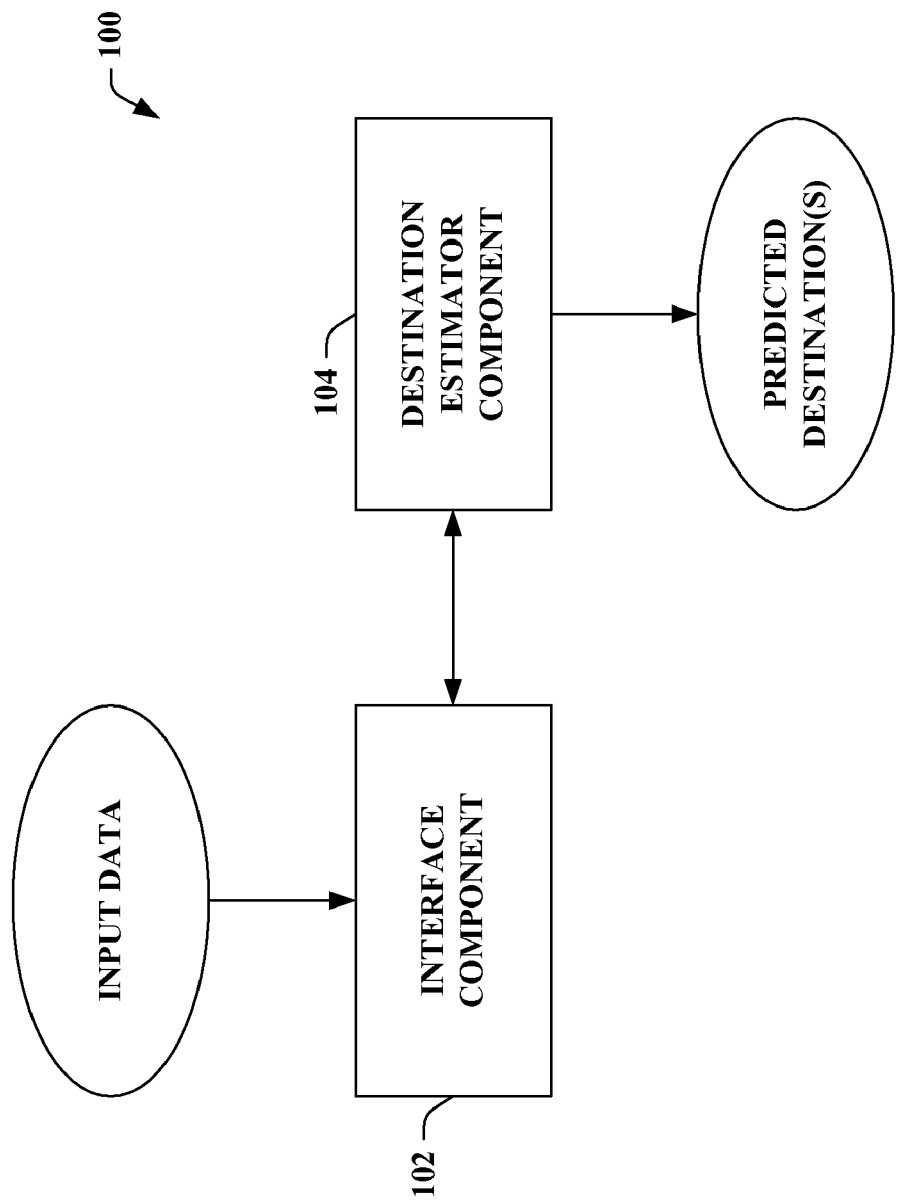
FIG. 1 illustrates a block diagram of an exemplary system that facilitates determining destination(s) of a user.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates determining destination(s) of a user. The system 100 includes an interface component 102 that receives input data that can relate to the user, the user's history, topography of a geographic area, a trip, an efficient route, etc. The interface component 102 can receive the input data from any source. For example, the interface component 102 can obtain input data from any component (not shown) that enables determining a location and/or a change in location of a user such as, for example, a component that supports a global positioning system (GPS), a satellite navigation system, GLONASS, Galileo, European Geostationary Navigation Overlay System (EGNOS), Beidou, Decca Navigator System, triangulation between communication towers, etc. By way of further illustration, the interface component 102 can receive input data associated with destinations to which the user has previously traveled (e.g., from a data store, by way of user input, . . . ). Additionally or alternatively, the interface component 102 can obtain input data from a timer component (not shown) that can determine an amount of time that the user has currently been traveling (e.g., during a current trip). Further, the interface component 102 can receive ground cover data; for example, such data can be obtained from a data store (not shown). It is to be appreciated that the interface component 102 can receive input data at any time; for instance, input data can be obtained by the interface component 102 while the user's trip progresses (e.g., in real time), prior to the user beginning a trip, etc.

The input data can be provided by the interface component 102 to a destination estimator component 104 that can evaluate the input data and probabilistically predict destination(s). The destination estimator component 104 can generate the predicted destination(s) utilizing prior(s) and/or likelihood(s) based at least in part on the input data. For instance, the destination estimator component 104 can employ a personal destinations prior, a ground cover prior, an efficient driving likelihood, and/or a trip time likelihood. It is to be appreciated that any number of priors and/or any number of likelihoods can be employed in combination to yield the predicted destination(s). By way of illustration, the destination estimator component 104 can utilize only a ground cover prior to probabilistically predict a destination associated with a trip. According to another example, the destination estimator component 104 can employ the personal destinations prior, the ground cover prior, the efficient driving likelihood and the trip time likelihood to probabilistically predict destination(s). It is to be appreciated that the claimed subject matter is not limited to these examples.

The destination estimator component 104 can evaluate data from various sources to predict a location to which an individual is traveling. According to an illustration, the destination estimator component 104 can probabilistically predict a destination prior to a trip beginning (e.g., when a user enters into a car, . . . ) or at any time during a trip. Thus, the input data can include data related to a current trip (e.g., a current location, a change in location, any number of locations associated with the current trip, an amount of time associated with a current trip, . . . ). Further, according to an example, as such a trip progresses, the destination estimator component 104 can utilize the input data from the trip to dynamically update prediction(s) of destination(s). Alternatively, the destination estimator component 104 can analyze input data that lacks information associated with a user's current trip and accordingly yield predictions based on disparate information (e.g., ground cover data, historical data, . . . ).

The destination estimator component 104 can output the predicted destination(s) as illustrated. Additionally, it is contemplated that the predicted destination(s) can be provided to the interface component 102 by the destination estimator component 104, and the interface component 102 can output the prediction(s) of the destination(s). It is to be appreciated that the predicted destination(s) can be provided to the user. Pursuant to an example, a map can be presented to the user that displays predicted destination(s). Additionally, the map can include information such as a course traversed thus far during a current trip and/or directions associated with a remainder of a trip to reach the predicted destination(s). Also, such a map can present information for targeted advertising; such advertising content can selectively be output based upon considerations of user preferences (e.g., user prefers gasoline A to gasoline B, fast food restaurant C rather than fast food restaurant D, . . . ). It is contemplated that the predicted destination(s) can be provided to the user utilizing any type of audile and/or visual signal. Further, the user can provide feedback associated with the predicted destination(s) (e.g., select one destination out of a set of predicted destinations, indicate that a predicted destination is incorrect, . . . ). Pursuant to another illustration, the prediction(s) of destination(s) can be transmitted to a disparate component (not shown) that can utilize the prediction(s) to yield relevant information (e.g., nearby points of interest, location based services, weather related information associated with the destination(s), traffic related information associated with the destination(s), targeted advertising, information associated with events, . . . ) that can thereafter be presented to the user (e.g., by way of an alert, . . . ).

The destination estimator component 104 can evaluate likely destinations based at least in part upon land cover data, the fact that travelers (e.g., drivers) typically utilize efficient routes, and/or a measured distribution of trip times. Additionally, the destination estimator component 104 can combine these cues (e.g., input data) with Bayes rule to probabilistically predict the destination(s). Further, the destination estimator component 104 can consider previous destination(s) (e.g., historical data) of the user and/or of disparate users; however, the claimed subject matter is not limited to the aforementioned examples. The destination estimator component 104 can also improve in accuracy over time as training data associated with the user is acquired. Pursuant to a further example, the destination estimator component 104 can allow the possible destinations to be located anywhere. According to another illustration, the destination estimator component 104 can constrain possible destinations to be on a road network; thus, accuracy may be improved since many actual destinations are on or near a road. However, the claimed subject matter is not so limited. Also, the destination estimator component 104 can consider contextual information such as, for instance, time of day, day of week (e.g., weekend versus weekday), holiday status, season, month of year, etc.

Although the interface component 102 is depicted as being separate from the destination estimator component 104, it is contemplated that the destination estimator component 104 can include the interface component 102 or a portion thereof Also, the interface component 102 can provide various adapters, connectors, channels, communication paths, etc. to enable interaction with the destination estimator component 104.

Knowledge of an individual's (e.g., driver's) destination can be an important parameter for delivering useful information while the individual is traveling (e.g., during a trip). For instance, an in-car navigation system can automatically depict traffic jams, gas stations, restaurants, and other points of interest that the driver is expected to encounter while traveling. Additionally, if the navigation system can make an accurate guess about the general region to which the driver is heading, then it can intelligently filter information it displays, thereby reducing the cognitive load. Further, although it may be possible to explicitly ask the driver about her destination, it is advantageous to mitigate requiring the driver to provide this information at the beginning of every trip. The system 100 can enable automatic prediction of destinations, for instance, by way of utilizing an algorithm to predict driving destinations based on the intuition that the driver will take a moderately efficient route to the destination. According to an aspect, predictions can be generated without modeling an individual's travel behavior (e.g., assume no prior knowledge of a driver's usual destinations such as work, home, school, . . . ); however, the claimed subject matter is not so limited. According to this example, the system 100 can be utilized in a new vehicle, a rental vehicle, or a city the driver has not previously visited.

Figure 2:
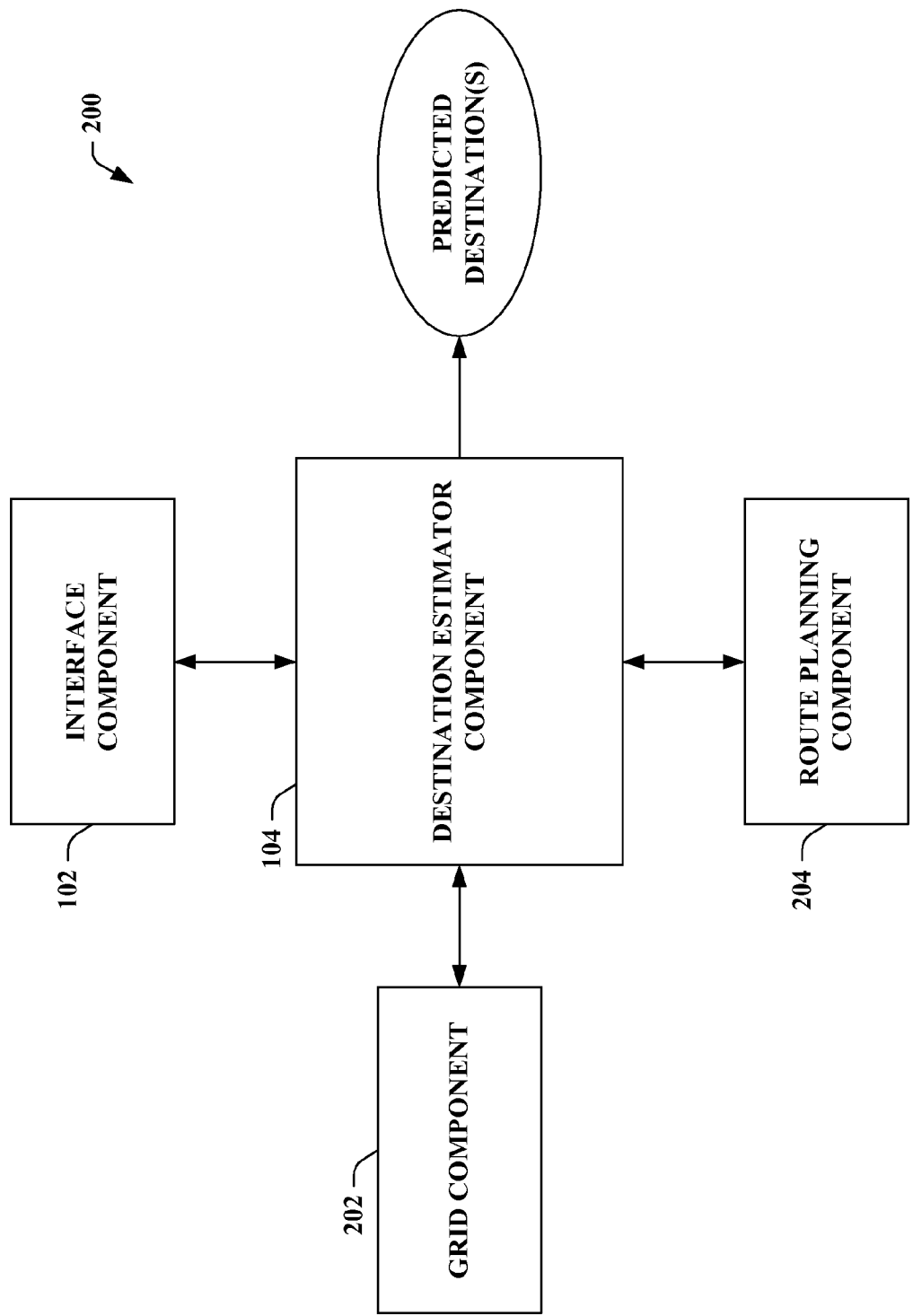
FIG. 2 illustrates a block diagram of an exemplary system that generates a probabilistic grid and/or route(s) between locations that can be utilized in connection with probabilistically predicting destination(s).

Turning to FIG. 2, illustrated is a system 200 that generates a probabilistic grid and/or route(s) between locations that can be utilized in connection with probabilistically predicting destination(s). The system 200 can include the interface component 102 that obtains input data and provides the input data to the destination estimator component 104. The destination estimator component 104 can probabilistically predict destination(s) associated with the input data. The destination estimator component 104 can utilize a probabilistic grid generated by a grid component 202 and/or any number of routes between locations (and any data associated therewith) yielded by a route planning component 204 to identify likely destination(s).

Pursuant to an example, the grid component 202 can generate a probabilistic grid that can be associated with a map. For instance, a two dimensional grid of squares (e.g., cells) can be associated with a map such that the squares (e.g., cells) can relate to any actual physical geographic area (e.g., 1 kilometer associated with each side of each of the squares of the grid, . . . ). Additionally, it is contemplated that the grid yielded by the grid component 202 can include cells of any shape (e.g., polygon with M sides, where M is a positive integer greater than two, circle, . . . ) or shapes other than or in addition to square shaped cells. The cells can represent a discrete location and can be associated with any tiling, size, and number. The cells can each be assigned a unique index (e.g., i=1, 2, 3, . . . , N, where N is any positive integer) and the destination estimator component 104 can identify a cell or cells within which the user is likely to end a trip (e.g., destination).

The destination estimator component 104 can compute a probability of each cell being the destination. For example, probabilities can be determined by evaluating P(D=i|X=x), where D is a random variable representing the destination, and X is a random variable representing the vector of observed features from a trip thus far. Additionally, likelihoods and/or priors can be utilized and Bayes rule can be applied to yield the following:

$$P(D=i \mid X=x) = \frac{P(X=x \mid D=i)P(D=i)}{\sum_{j=1}^{N} P(X=x \mid D=j)P(D=j)}$$

Accordingly, N can be a number of cells in the grid and P(D=i) can be a prior probability of the destination being cell i. The prior probability can be calculated, for example, with a personal destinations prior and/or a ground cover prior. Further, P(X=x|D=i) can be the likelihood of cell i being the destination based on an observed measurement X, which can be computed map information from various sources. For instance, the likelihood can be an efficient driving likelihood and/or a trip time likelihood. The denominator can be a normalization factor that can be computed to enable summing the probabilities of all the cells to equal one.

The route planning component 204 can provide routes between pairs of cells and/or estimations of driving times between each pair of cells in the grid generated by the grid component 202. The route planning component 204 can approximate the driving time utilizing a Euclidian distance and speed approximation between each pair of cells. Additionally or alternatively, the route planning component 204 can plan a driving route between center points (latitude, longitude) of pairs of cells to yield a more accurate driving time estimate. Thus, the route planning component 204 can provide an output based at least in part upon a road network and speed limits between cells.

Figure 3:
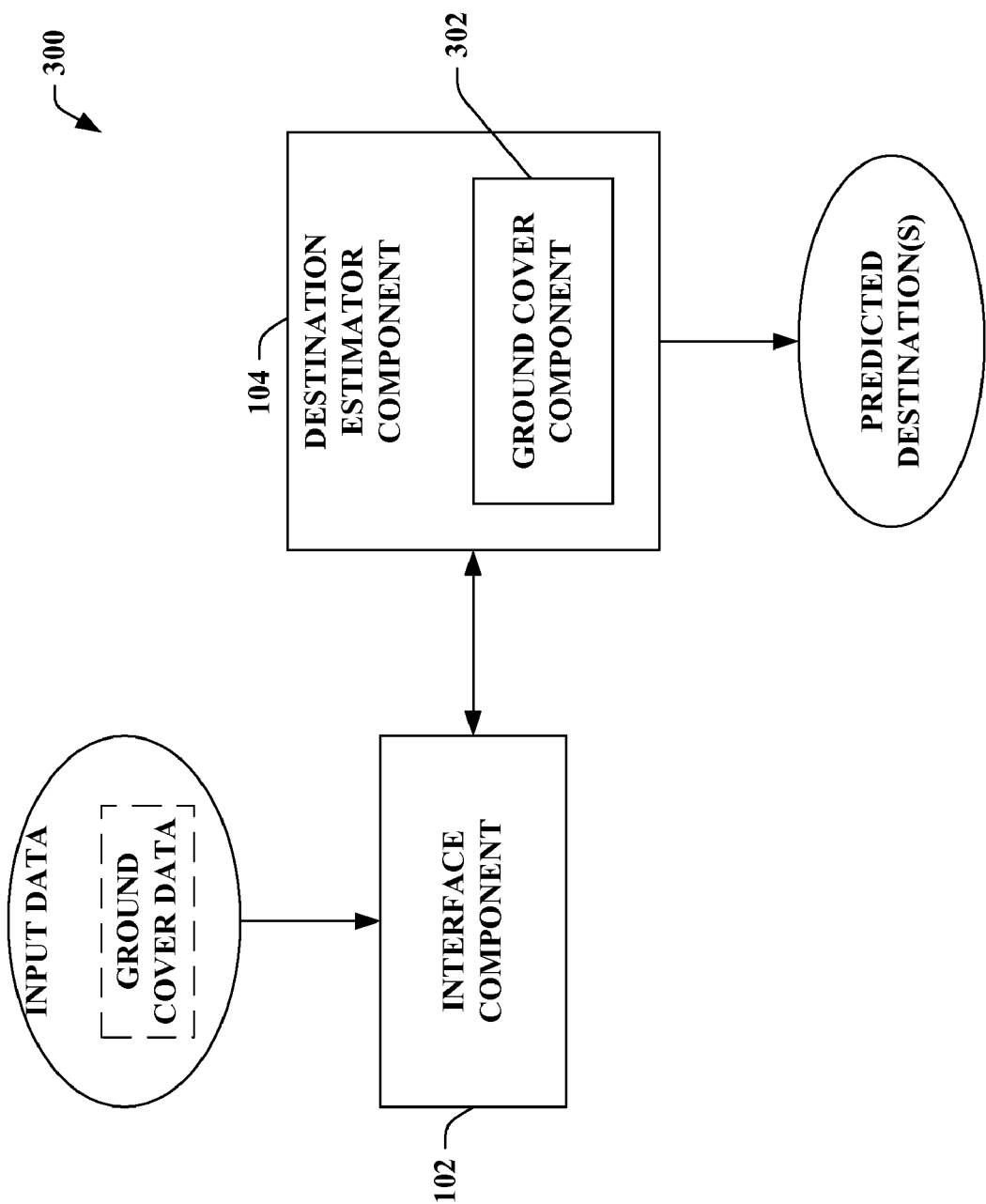
FIG. 3 illustrates a block diagram of an exemplary system that predicts destination(s) based on historical data.

Turning to FIG. 3, illustrated is a system 300 that provides predicted destination(s) based at least in part upon ground cover data. The system 300 comprises the interface component 102 that receives input data that can include ground cover data. The system 300 also includes the destination estimator component 104 that can generate predicted destination(s) based at least in part upon a ground cover prior generated by a ground cover component 302.

The ground cover component 302 can facilitate evaluating a probability that a cell is a destination based on ground cover data associated with the particular cell. The ground cover prior can be associated with topology related to a location. For example, middles of lakes and oceans are uncommon destinations for drivers, and commercial areas are more attractive destinations than places perennially covered with ice and snow. The interface component 102, for example, can facilitate obtaining a ground cover map that can enable the ground cover component 302 to characterize cells in a grid based on a United States Geological Survey (USGS) ground cover map; however, the claimed subject matter is not so limited as it is contemplated that the cells can be characterized utilizing any ground cover data. For instance, the USGS ground cover maps can categorize each 30 m×30 m square of the United States into one of twenty-one different types (e.g., emergent herbaceous wetlands, woody wetlands, orchard, perennial ice, small grains, row crops, bare rock, fallow, urban, high intensity residential, transitional, quarry, pasture, water, grasslands, mixed forest, shrub land, deciduous forest, evergreen forest, low intensity residential, commercial, . . . ) of ground cover. The ground cover component 302 can evaluate a latitude and/or longitude of each trip destination in a dataset to create a normalized histogram over the ground cover types (e.g., twenty one ground cover types), for example. Water can be an unpopular destination, although more popular than some other categories (e.g., emergent herbaceous wetlands, woody wetlands, . . . ), and commercial areas can be more attractive than those covered with ice and snow. Two more popular destinations can be "commercial" and "low intensity residential", which the USGS describes as:

Commercial/Industrial/Transportation—"Includes infrastructure (e.g., roads, railroads, . . . ) and all highly developed areas not classified as High Intensity Residential."

Low Intensity Residential—"Includes areas with a mixture of constructed materials and vegetation. Constructed materials account for 30-80 percent of the cover. Vegetation may account for 20 to 70 percent of the cover. These areas most commonly include single-family housing units. Population densities will be lower than in high intensity residential areas."

The "water" category can be associated with a nonzero likelihood because a 30 m×30 m USGS square can be categorized as water even if it is up to 25% dry land, which could include beaches and waterfront property depending on how the squares are placed. It is contemplated that different regions can be associated with different mixes of ground cover and residents of disparate regions can possibly have different behaviors in relation to types of ground cover.

According to an example, the ground cover component 302 can determine the probability of a destination cell if it were completely covered by ground cover type j for j=1, 2, 3, ..., 21 by evaluating P(D=i|G=j). According to an illustration, if the ground cover component 302 utilizes a probabilistic grid with 1 km×1 km cells, each cell can contain about 1,111 30 m×30 m ground cover labels (e.g., oftentimes the cells may not be completely covered by the same type). For each cell, the ground cover component 302 can compute the distribution of ground cover types, which can be referred to as $P_i(G=j)$. By way of illustration, the ground cover component 302 can compute the prior probability of each cell by marginalizing the ground cover types in the cell:

$$P_G(D=i) = \sum_{j=1}^{21} P(D=i, G=j) = \sum_{j=1}^{21} P(D=i \mid G=j) P_i(G=j)$$

$P_G(D=i)$ can be associated with the prior probability of a destination cell based on ground cover. Accordingly, the ground cover component 302 can determine that water and more rural areas can be lower-probability destinations, for instance. The ground cover prior generated by the ground cover component 302 (and a personal destinations prior obtained utilizing a user history component such as described below) can provide prior probability distributions because they are typically not based on measured features of the user's current drive.

Figure 4:
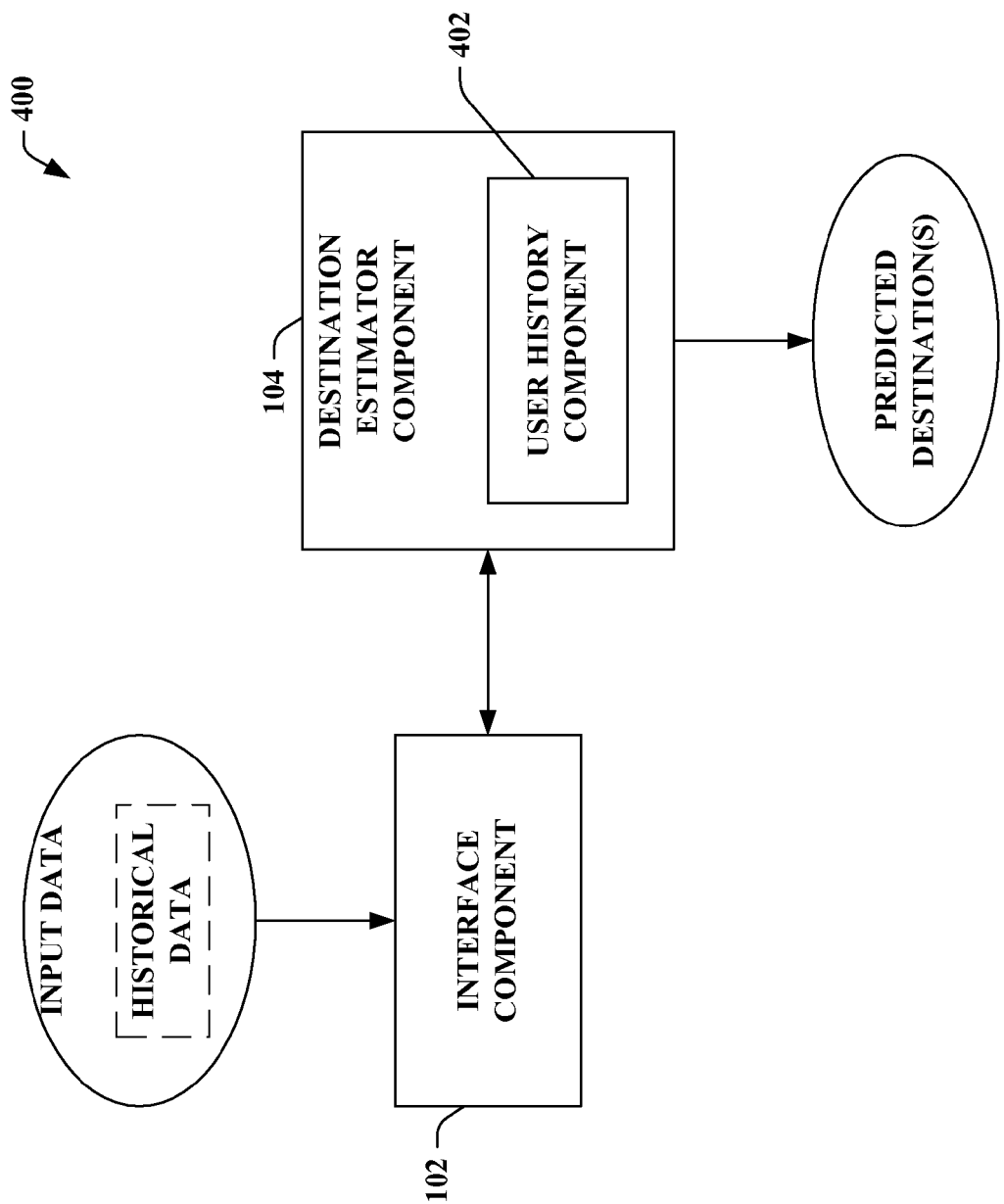
FIG. 4 illustrates a block diagram of an exemplary system that utilizes open world modeling to predict destination(s).

With reference to FIG. 4, illustrated is a system 400 that predicts destination(s) based on historical data. The system 400 includes the interface component 102 that receives input data. The input data can include historical data, for example. The historical data can be related to a particular user, a disparate user, and/or a set of users. For instance, the historical data can be related to a set of a user's previous destinations. By way of illustration, the interface component 102 can obtain the historical data from a data store (not shown). Additionally, the interface component 102 can provide the input data including the historical data to the destination estimator component 104 that probabilistically predicts destination(s) based on such data.

The destination estimator component 104 can further comprise a user history component 402 that evaluates the historical data to generate a personal destinations prior. Thus, the personal destinations prior can be employed by the destination estimator component 104 to facilitate predicting destination(s). It is to be appreciated that the destination estimator component 104 can utilize the personal destinations prior obtained by way of employing the user history component 402 alone and/or in combination with another prior and/or one or more likelihoods.

The user history component 402 can build on the intuition that drivers often go to places they have been before, and that such places should be given a higher destination probability. For instance, the user history component 402 can utilize the loss of a GPS signal to indicate that a user had entered a building. If the user enters the same building a number of times, that location can be marked as candidate destination for future prediction. Additionally, GPS-measured locations where a user spent more than a threshold amount of time (e.g., 10 minutes) can be clustered to extract likely destinations. Further, destinations can be extracted by clustering locations of long stays. Also, potential destinations can be inferred along with explicitly accounting for variations in scale of a destination's size and duration of stay.

According to another illustration, the user history component 402 can model personal destinations as grid cells including endpoints of segmented trips. As such, a spatial scale of a candidate destination can be the same as a cell's size, and the stay time to be considered a destination can be determined by a trip segmentation parameter (e.g., five minutes).

The user history component 402 can utilize disparate assumptions based on the personal destinations data: a closed-world assumption and an open-world assumption. The user history component 402 can utilize open world and/or closed world analyses, and can integrate both into a location forecast; thus, the analysis performed by way of the user history component 402 can include forecasting about both the likelihood of a driver visiting a previously unobserved location (as a function of an observation horizon), and the spatial relationships of new locations, given prior locations. Further, parameters for open-world inference can come from the observation of multiple people over time, and then can be mapped to individuals. Also, demographic information (e.g., age, gender, job type, religion, political affiliation, ...) can be considered in the open-world modeling. By way of illustration, the closed-world assumption can be associated with assuming that drivers only visit destinations that they have been observed to visit in the past. This can be referred to as the closed-world assumption, and corresponding analyses can be referred to as closed-world analyses. Making a closed-world assumption, the user history component 402 can examine the points at which the driver's trip concluded and make a histogram over the N cells. Normalizing gives a probability mass function $P_{closed}(D=i)$, i=1, 2, 3, ..., N, where the closed subscript indicates that this probability is based on personal destinations. If a user has not been observed to have visited a cell, the personal destinations probability for that cell can be zero. This is because this probability will be multiplied by other probabilities over the N cells in the Bayesian calculation to compute the posterior destination probability for each cell. If a cell has a zero prior, that cell may not survive as a possible destination.

The closed-world assumption is naïve in that people actually can visit locations they have never been observed to visit. This is the case in general, but such observations of new destinations can be especially salient in the early phases of observing a driver. On the latter, "new" locations include places a driver has visited before, but had not been observed to visit during the course of a study (e.g., observation/tracking of a user), as well as genuinely new destinations for that driver. Thus, a potentially more accurate approach to inferring the probability of a driver's destinations can be to consider the likelihood of seeing destinations that had not been seen before, thus leveraging an "open-world" model. By modeling this effect, a closed-world probability mass function taken at an early point in a survey (e.g., observation of the driver) can be transformed into an approximation of the steady state probability that can be observed at the end of the survey and beyond. This open world model then replaces $P_{closed}(D=i)$, and can yield a more accurate model of the places a subject tends to visit.

Figure 5:
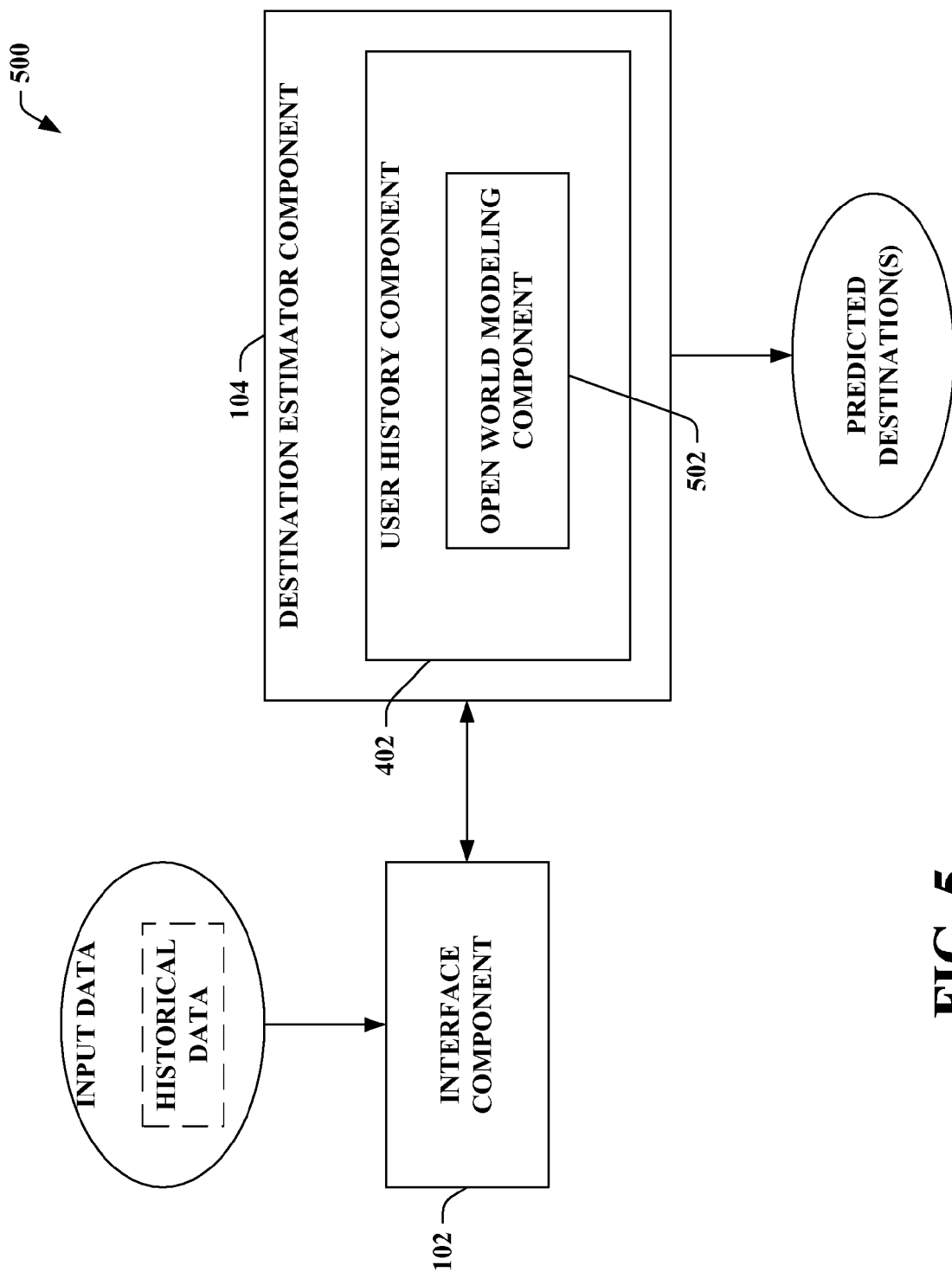
FIG. 5 illustrates a block diagram of an exemplary system that provides predicted destination(s) based at least in part upon ground cover data.

Referring to FIG. 5, illustrated is a system 500 that utilizes open world modeling to predict destination(s). The system 500 includes the interface component 102 and the destination estimator component 104. Further, the destination estimator component 104 includes the user history component 402 that evaluates historical data comprised in obtained input data. The user history component 402 can further include an open world modeling component 502 that explicitly considers a likelihood and location of new destinations that have not yet been observed (e.g., destinations not included as part of the historical data).

Figure 6:
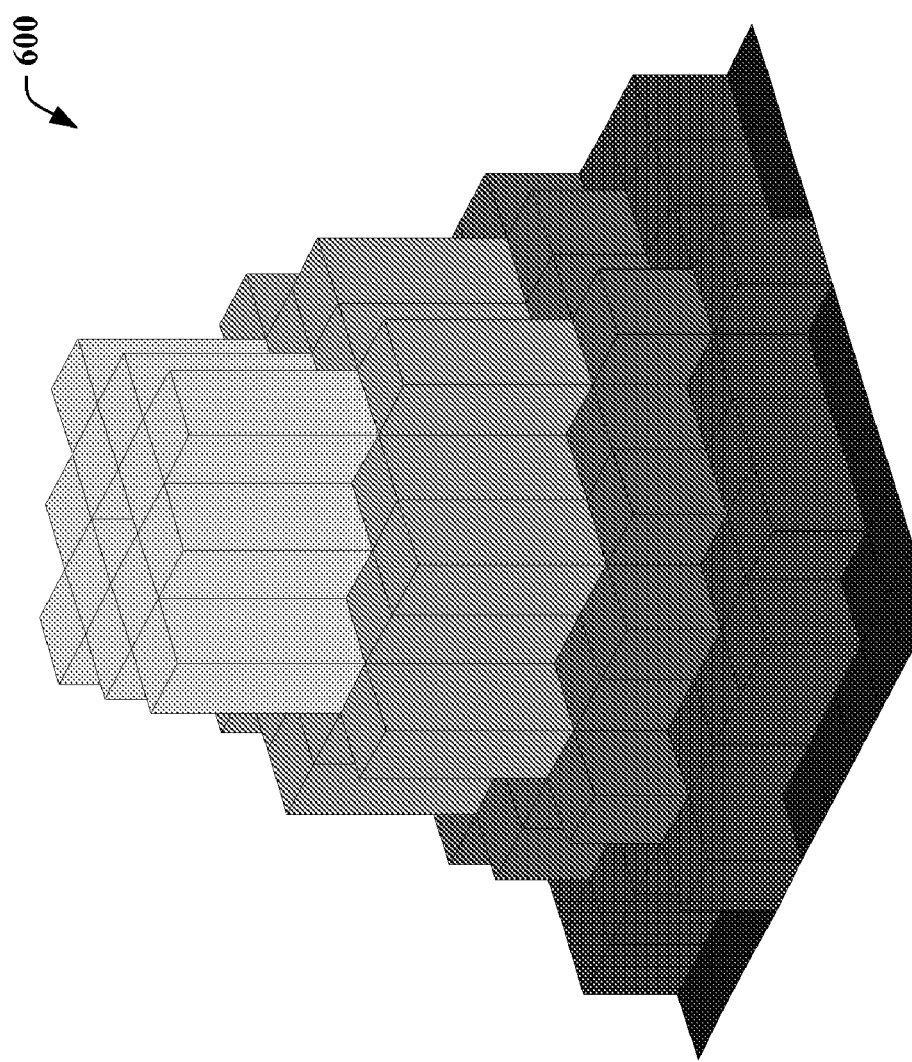
FIG. 6 illustrates an example of a 4-tier probability distribution with discretization over four threshold radii from a previously visited location.

The open world modeling component 502 can model unvisited locations in various manners. For example, unvisited locations can be modeled with the open world modeling component 502 based on an observation that destinations tend to cluster. By way of illustration, drivers may tend to go to places near each other to save time, or to overall regions they are familiar with, e.g. drivers might chose gas stations and grocery stores that are near their place of work. The open world modeling component 502 can model this effect as a discretized probability distribution over the distance from previously visited points. This distribution can have the overall shape of a tiered wedding cake as shown in FIG. 6. (FIG. 6 illustrates an example of a 4-tier probability distribution 600 with discretization over four threshold radii from a previously visited location). Each tier can give the probabilities of new destinations around previously visited ones. Each tier of the wedding cake can be a concentric ring of constant probability at some radius from center, and it is intended to model the eventual clustering of destinations in the steady state.

Referring again to FIG. 5, according to another example, the open world modeling component 502 can measure clustering tendency by looking at normalized histograms of destinations on a grid over disparate days of each subject's GPS survey. For each destination on a given day, the probability that an as-yet-unvisited destination would appear in the eventual steady state for each ring of a 10-tier wedding cake around that destination can be calculated. Each tier can be a ring of width one kilometer and a center radius of r={1, 2, ..., 10} kilometers, and the steady state can be taken from all the destinations visited over the whole survey. On day 1 of the survey, the probabilities of finding unvisited steady-state destinations near already-visited destinations can be relatively high. As the days go on, each subject gradually visits most of their usual destinations, so the probabilities drop. For each day, tiers near the center are higher than near the outer edge. Operationally, for a given closed-world probability $P_{closed}(D=i)$ from a given day, another probability with the unvisited neighbors of each nonzero $P_{closed}(D=i)$ replaced by a wedding cake with probability values for the appropriate day can be computed. This can simulate an expected spread in the steady state. After normalizing to one, the wedding cakes can be referred to as $W(D=i)$. This can be done separately for each subject.

Although the steady state destinations tend to cluster, isolated destinations can also occur. This effect can be characterized by computing the probability that a steady state destination would not be covered by a 10-tier wedding cake around a destination visited before steady state. This probability can be referred to as $\beta$. The probability of new, isolated destinations can drop with time. One way to model this background probability is with a uniform distribution over all grid cells. However, this can contribute probability to places where no one goes, like middles of lakes. Instead of a uniform distribution, the open world modeling component 502 can take the background as $P_G(D=i)$, which is the ground cover prior as described previously.

These effects can be combined to compute a probability distribution of destinations that more accurately models the steady-state probability. The three components can be the closed-world prior $P_{closed}(D=i)$, the parameterized spread as represented by the wedding-cake shaped distributions $W(D=i)$ described above, and the background probability $P_G(D=i)$ to model isolated destinations. A fraction $\alpha$ of the total probability to $W(D=i)$ may be apportioned, where $\alpha$ is the sum of the tiers for the appropriate day. A learned fraction $\beta$ of the probability, capturing the probability that users will travel to places beyond the tiered distributions is allocated to the background. The open-world version for the probability of a driver's destinations, which can be a prior probability, can then computed as $$P_{open}(D=i)=(1-\alpha-\beta)P_{closed}(D=i)+\alpha W(D=i)+\beta P_G(D=i)$$

This can be referred to as the open-world prior probability distribution. Further, the open world modeling component 502 can utilize this in Bayes formula.

As time goes on, $\alpha$ and $\beta$ tend to decrease, deemphasizing the adjustment for clustering and background probability in favor of each subject's actual learned destinations. This represents the richness of an open-world model that takes into appropriate consideration the fact that people can visit new locations, especially early on in the observation period, but also in the long run.

The open-world prior probability distribution, $P_{open}(D=i)$, may approximate a subject's steady state distribution of destinations better than the naïve, closed-world prior $P_{closed}(D=i)$. Further, the open-world prior can work with a prior much closer to the actual steady state than with the closed-world model.

Figure 7:
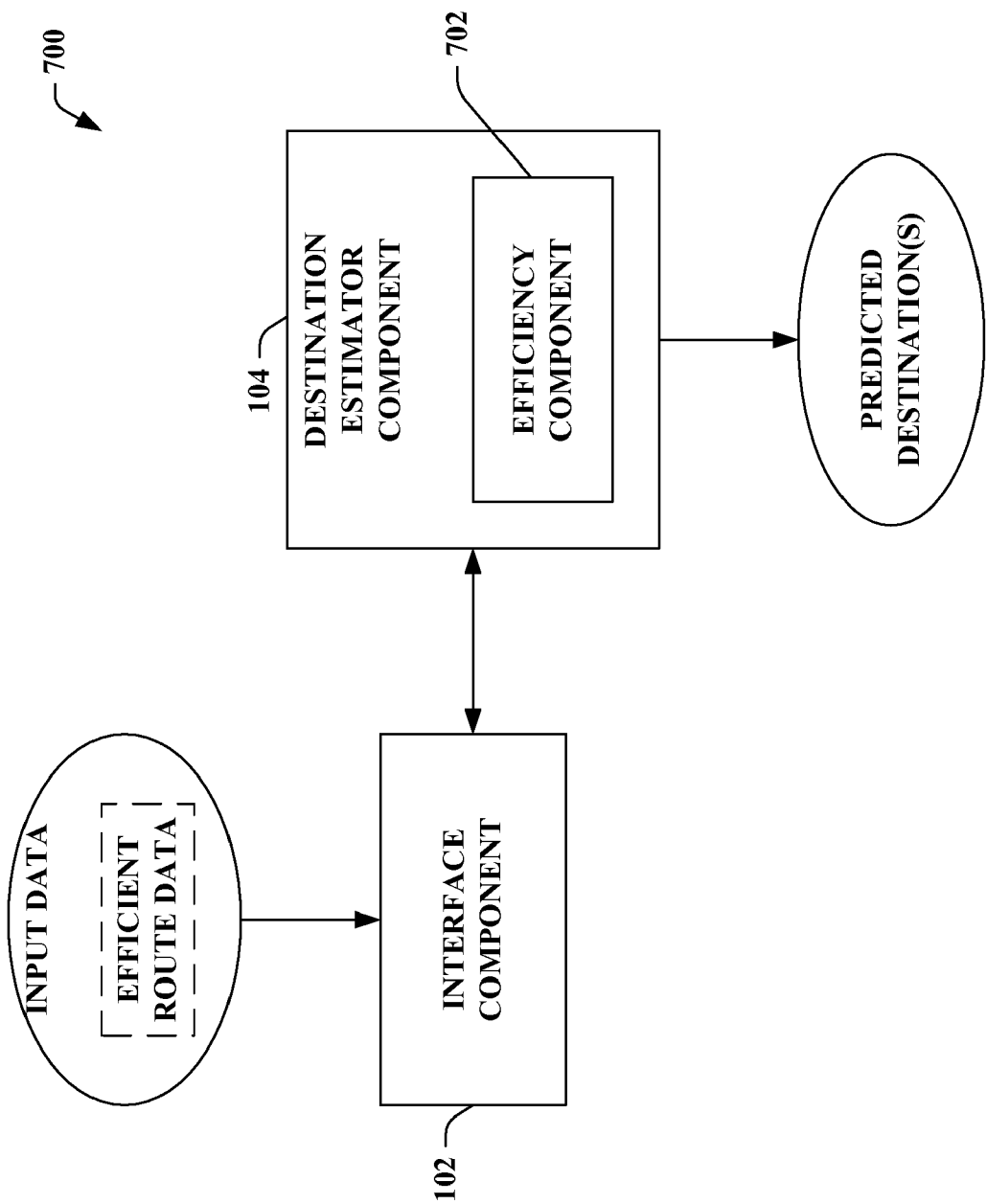
FIG. 7 illustrates a block diagram of an exemplary system that yields predictions of destination(s) based at least in part upon efficient route data.

FIG. 7 illustrates a system 700 that yields predictions of destination(s) based at least in part upon efficient route data. The system 700 includes the interface component 102 that can obtain input data. The input data can include efficient route data that can be stored in a data store (not shown), generated by a route planning component (e.g., route planning component 204 of FIG. 2), etc. Additionally or alternatively, the interface component 102 can obtain data associated with a user's current trip (e.g., data related to a location, a change in location, an amount of time for a trip, ... ). The input data can be evaluated by the destination estimator component 104 that can further comprise an efficiency component 702. The destination estimator component 104 can accordingly generate predicted destination(s) based on an efficient driving likelihood provided by the efficiency component 702. The efficiency component 702 can compute a driving efficiency associated with a set of candidate destinations (e.g., each candidate destination) as evidence about a final location/destination, which can be utilized by the destination estimator component 104.

The efficient driving likelihood generated by the efficiency component 702 can be based on a change in time until an arrival at a candidate destination. For instance, the efficient driving likelihood can be based on a user's current trip. The efficient driving likelihood (as well as any other likelihood) can be of the form $P(X=x|D=i)$, where x is some measured feature of the current trip. The measured feature associated with the efficient driving likelihood can be the list of cells the driver has already traversed, and the intuition behind the likelihood can be that drivers generally do not pass up opportunities to get to their destinations in an efficient manner.

The efficiency component 702 can quantify efficiency using the driving time between points on the driver's path and candidate destinations. Thus, for each pair of cells (i, j) in the probabilistic grid, the efficiency component 702 can estimate the driving time $T_{i,j}$ between them and/or receive an estimation as part of the efficient route data. Pursuant to an illustration, a first approximation to the driving time could be generated by the efficiency component 702 utilizing a simple Euclidian distance and speed approximation between each pair of cells. Additionally or alternatively, the efficiency component 702 can employ desktop mapping software to plan a driving route between the center (latitude, longitude) points of pairs of cells. The mapping software can provide a programmatic interface which can provide the estimated driving time of planned routes. Using a driving route planner can account for a road network and speed limits between cells, giving a more accurate driving time estimate. For N cells, there can be N(N−1) different ordered pairs, not including pairs of identical cells. Additionally, routes can be planned by assuming that the travel time from cell i to j is the same as from cell j to i, i.e. $T_{i,j}=T_{j,i}$. It is noted that this computation may only have to be performed once for a particular grid.

The efficiency component 702 can assume that drivers will not pass up an opportunity to get to their destination quickly. For instance, if a driver comes close to his or her destination at one point during the trip, he or she is unlikely to subsequently drive farther from the destination. In other words, as a trip progresses, it can be expected that the time associated with reaching the destination can decrease monotonically. According to an example, the efficiency component 702 can enable testing this assumption using trip data. Pursuant to this example, each trip can be converted into a sequence of traversed cells (with no adjacent repeated cells) and each sequence can be examined one cell at a time. While examining each sequence, the minimum time to the destination cell over the cells traversed so far can be tracked. An efficient route can reduce this minimum time as the sequence progresses. For each cell transition in the sequence, Δt, which can be the change in estimated driving time achieved by transitioning to the new cell over the minimum time to the destination encountered so far, can be computed. The time can be negative and thus the cell transition can reduce the time to the destination.

The normalized histogram of Δt's can be an estimate for P(ΔT=Δt), which gives the probability of the change in trip time that a driver's transition to the next cell will cause, with reference to the closest the driver has been to the destination so far. The probability that the driver will reduce the minimum time to the destination can be $$p = \int_{\Delta t<0} P(\Delta T = \Delta t)d\Delta t = 0.625,$$

for instance. According to this example, 1−p=0.375, or 37.5% of the time, the driver's move to a new cell actually increased the time to the destination. However, this number may be artificially high due to drivers' specialized knowledge that the route planner may not have, such as shortcuts, changes in the road network, and traffic conditions. Also, discretizing space can mean that cell-to-cell routes, depending on where the cell centers fell, had to sometimes account for highway entrances and exits that a driver would not necessarily have to negotiate if he or she were only passing through. The mean and median of P(ΔT=Δt) can be −22.2 seconds and −39.0 seconds, respectively; thus, on average the data can illustrate that drivers do generally proceed toward their destinations with each transition to a new cell in the grid.

The efficiency component 702 can compute $P_E(S=s|D=i)$, which can be the probability of S, the trip so far, given a destination. The trip S can be represented as the series of cells traversed so far, with no adjacent repeats: S={$s_1, s_2, s_3, \ldots, s_n$}. It can be assumed that at each cell $s_j$ the driver makes an independent decision of which cell to drive to next, meaning that this likelihood can be computed as $$P_E(S=s|D=i) = \prod_{j=2}^{n} \begin{cases} p & \text{if } s_j \text{ is closer to destination } i \text{ than any previous cell in } S \\ 1-p & \text{otherwise} \end{cases}$$

Here n can be a number of grid cells traversed in the trip so far. This equation multiplies p if the new cell is closer to destination i than any previous cell, indicating the driver has made a move that decreases the estimated time to cell i, otherwise it multiplies 1−p. As long as p>0.5, this likelihood favors cells that the driver is moving toward.

Utilizing this likelihood and a uniform prior, posterior distributions can be obtained with the efficiency component 702. By way of illustration, as a trip starts in a particular direction (e.g., south) from a particular location, certain cells can be eliminated as destinations (e.g., cells to the north can be eliminated as destinations); the destination probabilities can be depicted upon a map, for instance. After traveling farther south, all but the southern portion can be eliminated.

Pursuant to an example, a driver may engage in more random meandering at a beginning of a trip as compared to when her real destination is close (e.g., at an end of the trip). Thus, the probability that the driver will move closer to her ultimate destination at each time step, p, can vary as a function of time into a trip. Accordingly, p can be lower at the beginning of a trip as compared to the end of the trip.

According to another example, the efficiency component 702 can measure efficiency based on the trip's starting cell s and a candidate destination cell i. If the driver's route is efficient, then the total time required to go between these two cell should be about $T_{s,i}$. If the driver is currently at cell j, then the time to reach the candidate destination i should be about $T_{j,i}$. If i really is the destination, and if the driver is following an efficient route, then the driver should have taken a time of $T_{s,i}-T_{j,i}$ to reach the current cell j. The driver's actual trip time to this point is Δt, which will be longer than $T_{s,i}-T_{j,i}$ if the driver is taking an inefficient route. Thus, the efficiency component 702 can measure efficiency as the ratio of how much time the driver should have spent moving toward the candidate destination divided by how much time has actually transpired:

$$e_i = \frac{T_{s,i} - T_{j,i}}{\Delta t}$$

Such ratio can be expected to be about one for an efficient trip between s and i. Using GPS survey data, the distributions of efficiency values can be computed based on known trips and their corresponding destinations. The efficiency likelihood $P_E(E=e|D=i)$ represents the efficiency that drivers actually produce on their way to a destination. If a candidate destination results in a low-likelihood efficiency, its posterior probability can be correspondingly low when $P_E(E=e|D=i)$ is incorporated in Bayes rule. The efficiency likelihood can vary as a function of a fraction of a trip; thus, the distribution near the beginning of such trip can be unrealistic due to an inability to give accurate travel times for short trips. For all trip fractions, some drivers can be able to boost their efficiency beyond 1.0, either due to speeding or mistakes in the ideal trip time estimates. The effect of using this likelihood for destination prediction can be that if a driver appears to be driving away from a candidate destination, that destination's probability will be lowered.

Figure 8:
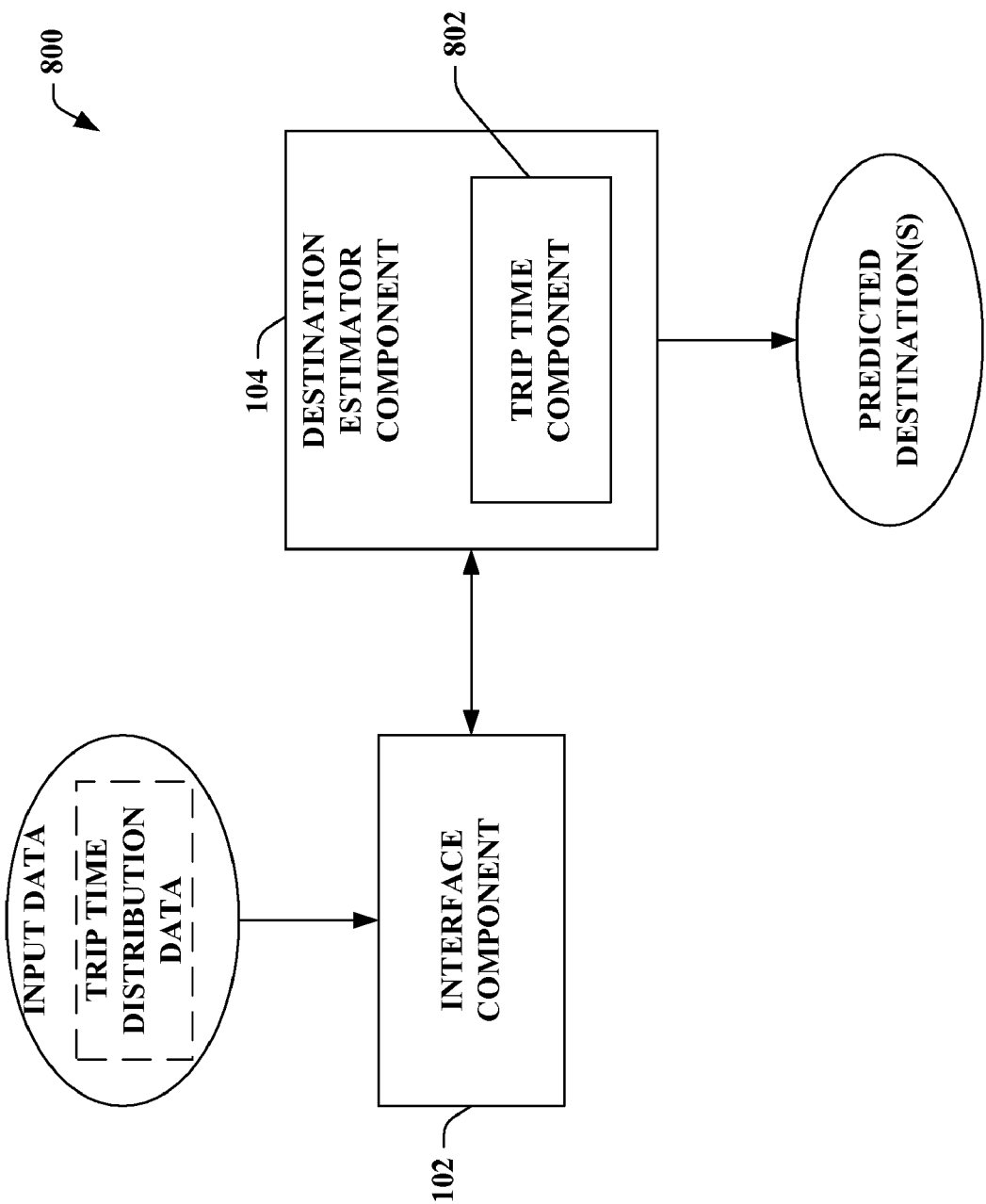
FIG. 8 illustrates a block diagram of an exemplary system that evaluates trip time in connection with predicting destination(s).

Turning to FIG. 8, illustrated is a system 800 that evaluates trip time in connection with predicting destination(s). The system 800 includes the interface component 102 that obtains input data and the destination estimator component 104 that evaluates the input data to yield predicted destination(s). The destination estimator component 104 can further include a trip time component 802 that evaluates a likelihood associated with an estimated time to a candidate destination and/or an elapsed trip time related to a current trip.

The trip time component 802 can generate the trip time likelihood based at least in part utilizing trip time distribution data that can be included as part of the input data. For instance, the trip time distribution data can be from a National Household Transportation Survey (NHTS); however, the claimed subject matter is not so limited. By way of example, the NHTS from year 2001 can include data related to daily travel and/or longer-distance travel from approximately 66,000 U.S. households. Additionally, the survey results can be available by way of a web interface, and a histogram of trip times can be generated.

The likelihood governing trip times can be $P_T(T_S = t_S | D = i)$, where $T_S$ is the random variable representing the trip time thus far. For use of this likelihood, the trip time component 802 can quantize the trip times according to bins associated with the histogram. The histogram can represent the distribution of destination times before a trip has started, e.g., $P(T_D = t_D)$, where $T_D$ represents the total trip time. Once some time has passed on a trip, the probability of times that have been passed drops to zero, and a normalization can be effectuated to yield:

$$P_T(T_s = t_s | D = i) = \begin{cases} 0 \text{ if } t_D < t_s \\ P(T_D = t_D) / \sum_{t_D \geq t_S} p(T_D = t_D) \text{ if } t_D \geq t_S \end{cases}$$

To compute the likelihood for a candidate destination, $t_S$ can be the length of the trip so far and $t_D$ can be the estimated time to the candidate destination from the current cell, based on the $T_{i,j}$ estimated trip times. Utilizing this likelihood and/or a uniform prior, posterior distributions can be obtained.

Figure 9:
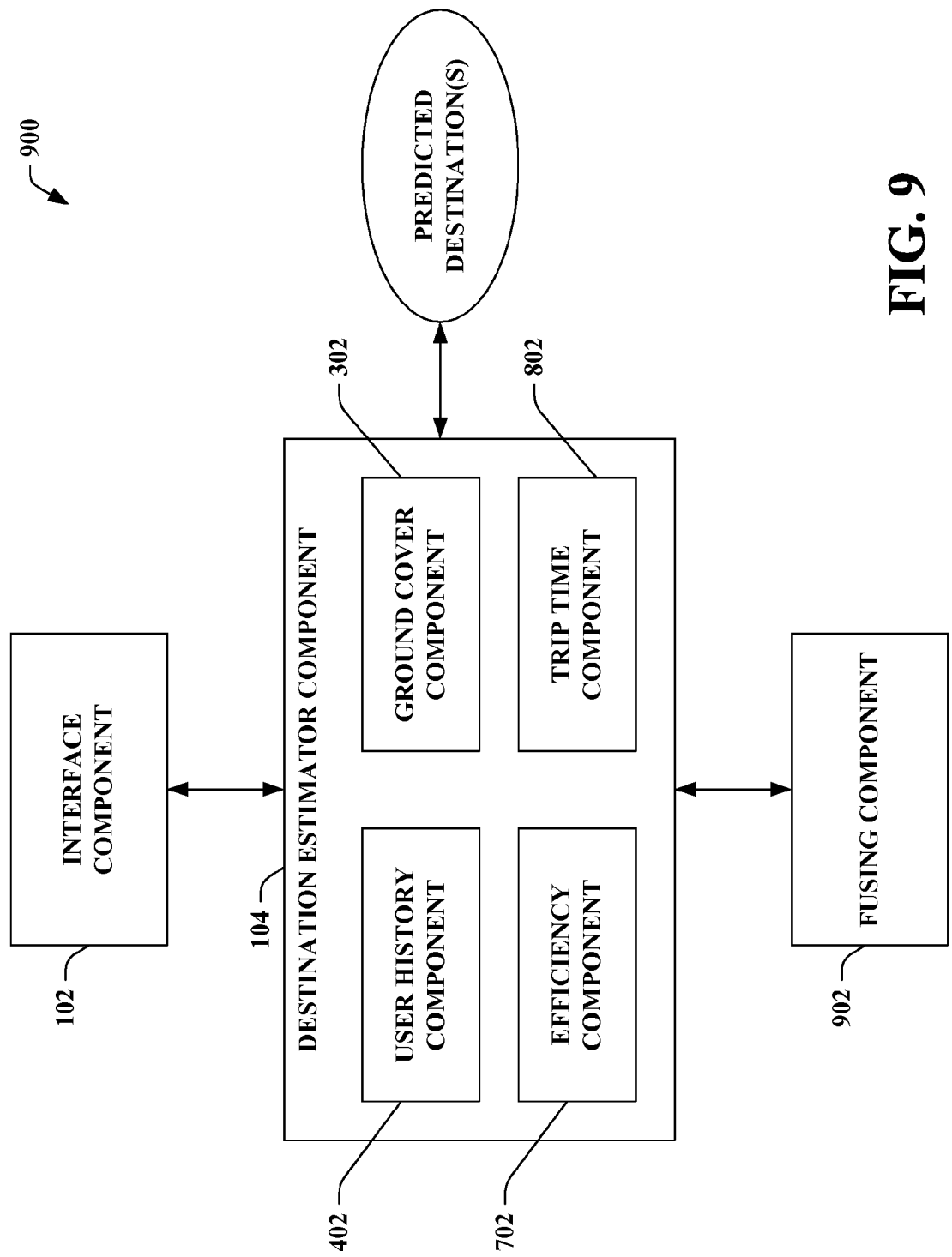
FIG. 9 illustrates a block diagram of an exemplary system that enables combining prior(s) and/or likelihood(s) to facilitate predicting destination(s).

With reference to FIG. 9, illustrated is a system 900 that enables combining prior(s) and/or likelihood(s) to facilitate predicting destination(s). The system 900 includes the interface component 102 that can obtain input data. Additionally, the system 900 includes the destination estimator component 104 that probabilistically predicts destination(s) by way of employing prior(s) and/or likelihood(s). The destination estimator component 104 can further comprise the user history component 402 that yields a personal destinations prior, the ground cover component 302 that generates a ground cover prior, the efficiency component 702 that provides an efficient driving likelihood and/or the trip time component 802 that produces a trip time likelihood.

The destination estimator component 104 can additionally be coupled to a fusing component 902 that can enable selecting prior(s) and/or likelihood(s) to utilize in association with probabilistically predicting the destination(s). The fusing component 902 can combine the selected prior(s) and/or likelihood(s). For instance, the fusing component 902 can yield one probability distribution associated with the selected prior(s) and/or likelihood(s). By way of illustration, the personal destinations prior can be selected; accordingly, the fusing component 902 can generate a probability distribution based upon the personal destinations prior. Pursuant to another example, the ground cover prior, efficient driving likelihood and trip time likelihood can be selected, and thus, the fusing component 902 can combine the selected prior and likelihoods. It is to be appreciated that the claimed subject matter is not limited to these illustrations.

The fusing component 902 can assume independence of the driving efficiency and the trip duration likelihoods given the destinations, and can combine these two elements and the prior into a single posterior probability for each destination using Bayes rule. Thus, the destination probability can be as follows:

$$P(D = i | E = e, \Delta T = \Delta t) = \frac{P_E(E = e | D = i) P_{\Delta T}(\Delta T = \Delta t | D = i) P_{open}(D = i)}{\sum_{j=1}^{N} P_E(E = e | D = j) P_{\Delta T}(\Delta T = \Delta t | D = j) P_{open}(D = j)}$$

Considering such independencies is referred to as the naïve Bayes formulation of Bayesian updating. Relaxing the independence assumptions to allow richer probabilistic dependencies can enhance accuracy of predictions because introducing realistic dependencies minimizes "overcounting" of probabilistic influences. In this case, the relationships between driving efficiency and duration may not be considered. Further, the above destination probability equation can be evaluated by computing a grid of scalars for each of the probabilistic components, multiplying the scalars in corresponding cells, and normalizing to make the sum of the products one.

The probabilistic formulation of destination prediction means that uncertainties about the driver's true destination can be represented in a coherent manner. Thus, applications built on a system such as the destination estimator 104 can account for the inevitable uncertainty in a driver's destination. For instance, an application that shows restaurants or gas stations near a driver's destination could progressively show more detail and less area as the destination becomes more certain. Warnings about traffic problems could be held until the certainty of encountering them exceeds a certain threshold. Cognitively impaired people deviating from their intended destination could be warned only when the deviation becomes nearly certain.

Figure 10:
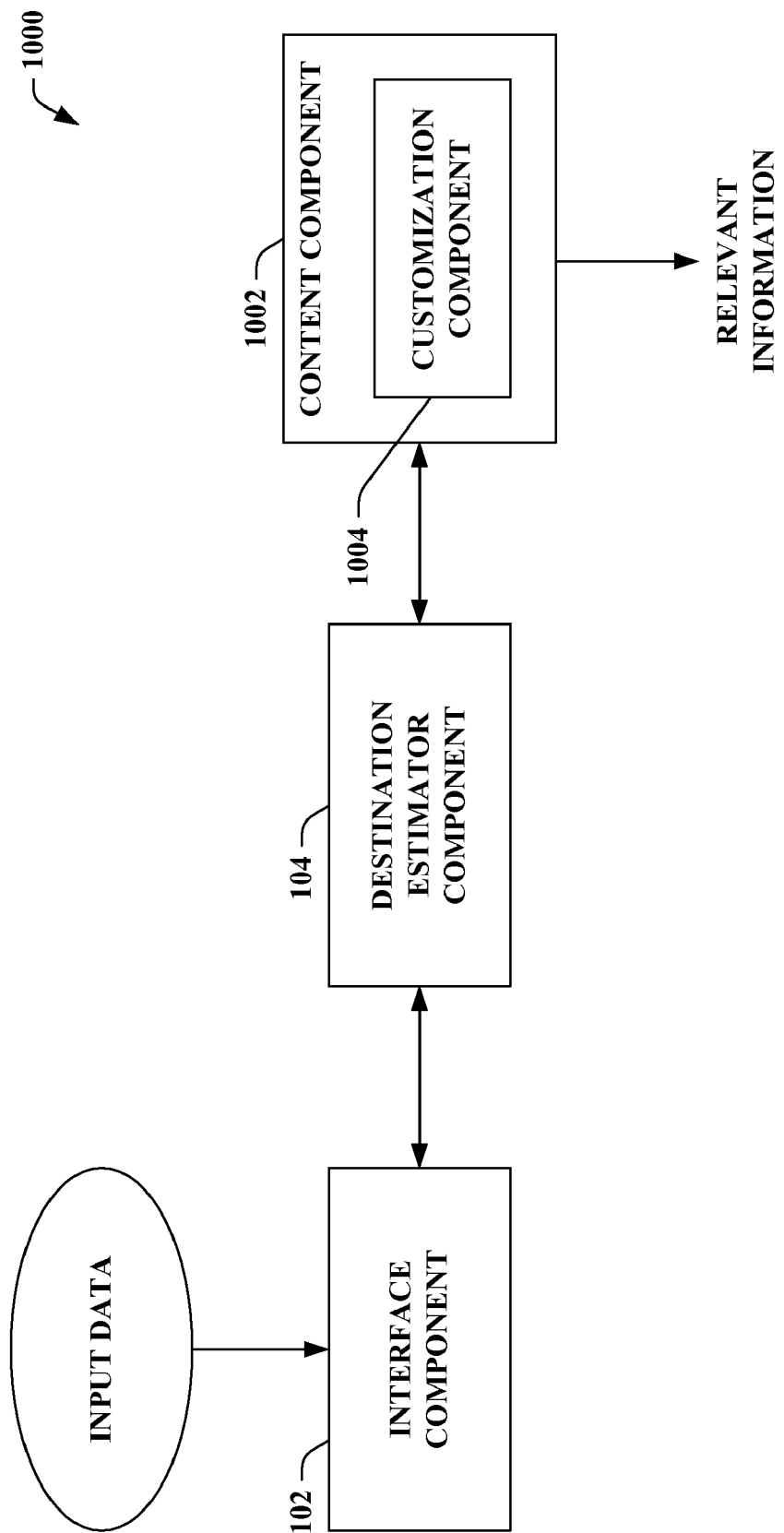
FIG. 10 illustrates a block diagram of an exemplary system that provides information that can be relevant to predicted destination(s).

FIG. 10 illustrates a system 1000 that provides information that can be relevant to predicted destination(s). The system 1000 includes the interface component 102 that receives input data and the destination estimator component 104 that probabilistically predicts destination(s) based on the input data. For instance, the destination estimator component 104 can utilize one or more priors and/or one or more likelihoods to generate the predictions. The predicted destination(s) can further be provided to a content component 1002 that provides relevant information associated with the predicted destination(s). For example, the content component 1002 can provide warnings of traffic, construction, safety issues ahead, guide advertisements being displayed, provide directions, routing advice, updates, etc.

The content component 1002 can provide any information that is relevant to the predicted destination(s). For instance, the content component 1002 can yield information that relates to restaurants, traffic, navigation assistance, gas stations, landmarks, retail establishment, etc. According to an example, a particular destination can be provided to the content component 1002. Pursuant to this example, the content component 1002 can provide an alert that includes information associated with the particular location and/or information associated with any location that is nearby to the route between a current location and the destination. Thus, the content component 1002 can indicate that events are happening at a location, traffic is heavy, etc. According to another example, the content component 1002 can provide advertising information associated with establishments located at the destination and/or nearby to the route. Pursuant to another example, if the user appears to be lost, an alert can be provided by the content component 1002 to enable the user to continue upon a proper route to the predicted destination.

The content component 1002 can include a customization component 1004 that tailors relevant information that is provided by the content component 1002 to a particular user based on user related preferences. For instance, the user related preferences can indicate that the user desires not to receive any advertisements; accordingly, the customization component 1004 can mitigate transmission of such relevant information. Pursuant to another illustration, a user may desire to be apprised of any traffic accidents along a route to her destination; thus, the customization component 1004 can enable the content component 1002 to provide such information and/or can prioritize traffic related information as compared to disparate information provided by the content component 1002. It is to be appreciated that the claimed subject matter is not limited to the aforementioned examples.

Figure 11:
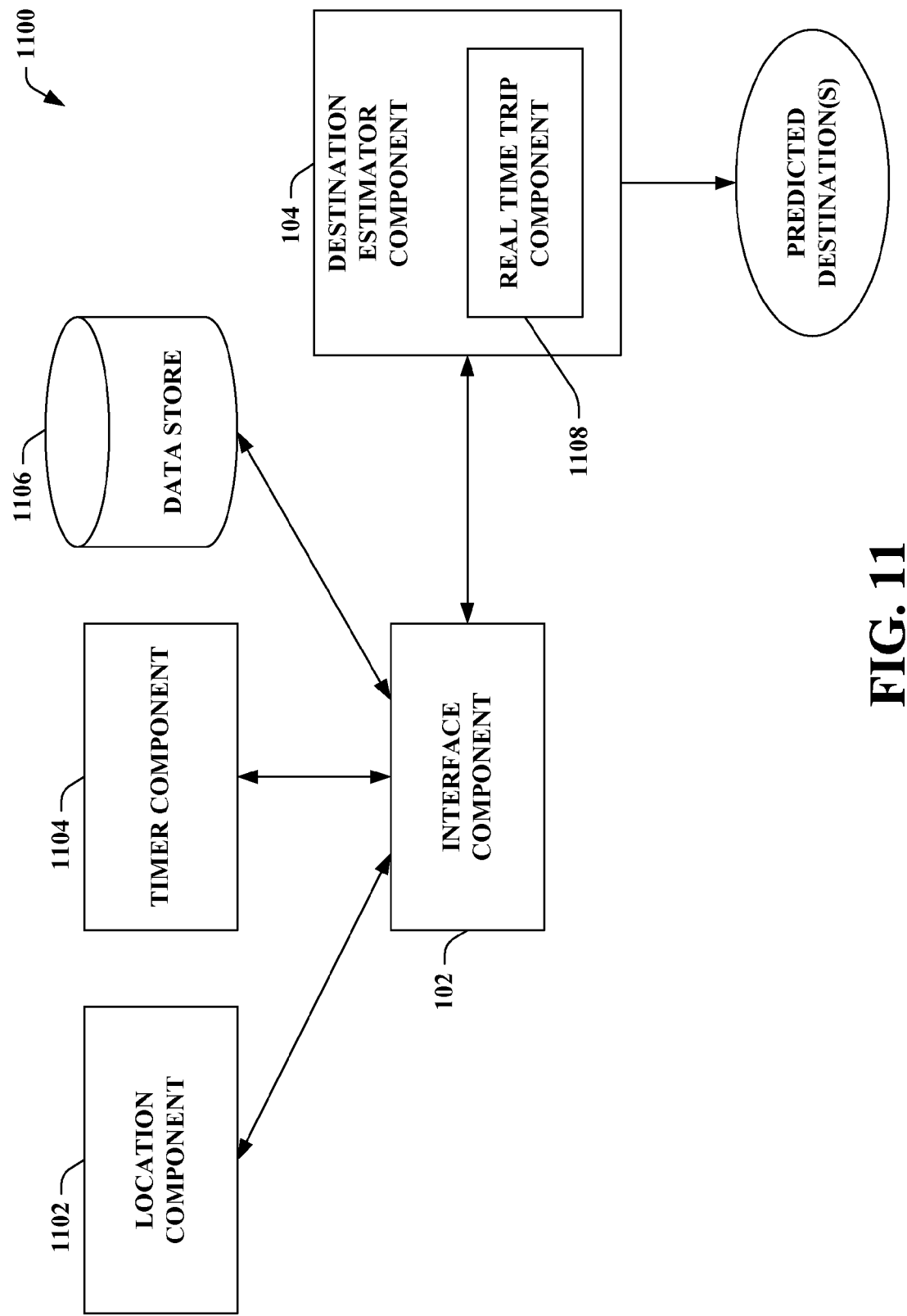
FIG. 11 illustrates a block diagram of an exemplary system that probabilistically predicts destination(s) during a trip.

Turning to FIG. 11, illustrated is a system 1100 that probabilistically predicts destination(s) during a trip. The system 1100 includes the interface component 102 and the destination estimator component 104. Additionally, the system 1100 includes a location component 1102 that identifies a current location and/or a change in location of a user and/or a device. For example, the location component 1102 can be associated with GPS, a satellite navigation system, GLONASS, Galileo, European Geostationary Navigation Overlay System (EG-NOS), Beidou, Decca Navigator System, triangulation between communication towers, etc. The location component 1102 can provide the location related data to the interface component 102 to enable further evaluation.

The system 1100 can additionally include a timer component 1104 that provides time related data to the interface component 102. The timer component 1104 can, for example, provide time related data that includes an amount of time associated with a current trip, an amount of time associated with little or no movement, etc. Additionally, although depicted as separate components, it is contemplated that the location component 1102 and the timer component 1104 can be a single component.

The interface component 102 can also be coupled to a data store 1106. The data store 1106 can include, for instance, data related to a user, the user's history, topography of a geographic area, a trip, an efficient route, etc. Additionally, location related data provided by the location component 1102 and/or time related data obtained from the timer component 1104 can be stored in the data store 1106. The data store 1106 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 1106 of the subject systems and methods is intended to comprise, without being limited to, these and any other suitable types of memory. In addition, it is to be appreciated that the data store 1106 can be a server, a database, a hard drive, and the like.

Further, the destination estimator component 104 can include a real time trip component 1108 that can utilize data associated with a current trip to probabilistically predict destination(s); however, it is contemplated that such data need not be utilized to generate predicted destination(s). By way of example, the real time trip component 1108 can assemble location data associated with a particular trip that can be provided by the location component 1102. The assembled location data can then be employed to generate predictions.

Figure 12:
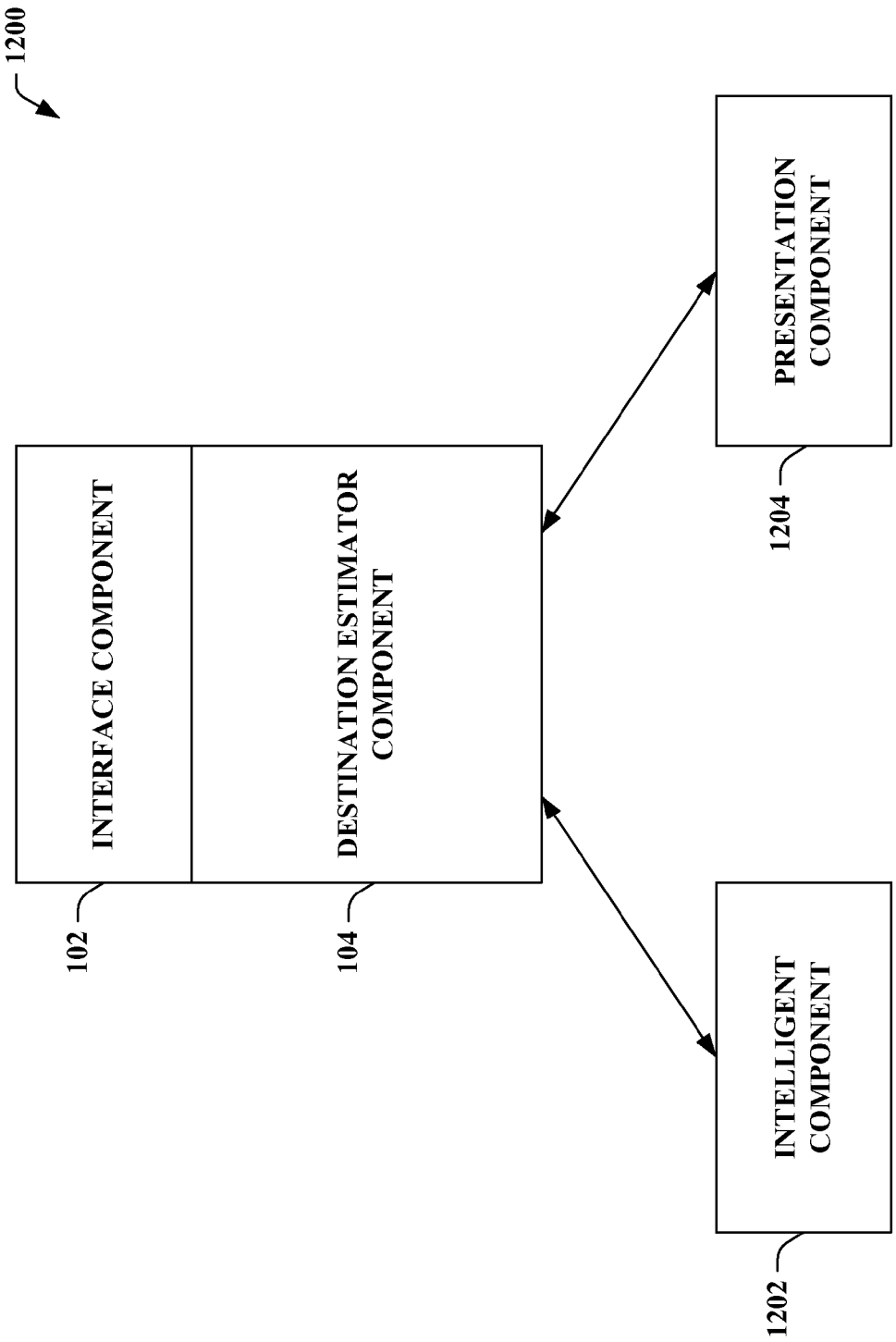
FIG. 12 illustrates a block diagram of an exemplary system that facilitates generating predicted destination(s).

With reference to FIG. 12, illustrated is a system 1200 that facilitates generating predicted destination(s). The system 1200 can include the interface component 102 and the destination estimator component 104, which can be substantially similar to respective components described above. The system 1200 can further include an intelligent component 1202. The intelligent component 1202 can be utilized by the destination estimator component 104 to facilitate predicting destination(s) associated with input data. For example, the intelligent component 1202 can identify that a user employed a shortcut to traverse to a predicted destination. Thus, the identified shortcut can be stored and/or utilized in association with evaluating future destination(s). According to another example, the intelligent component 1202 can determine a combination of prior(s) and/or likelihood(s) (or one prior or one likelihood) that can yield a more accurate destination prediction (e.g., as compared to a current combination). Thereafter, the destination estimator component 104 can employ the combination identified by the intelligent component 1202.

It is to be understood that the intelligent component 1202 can provide for reasoning about or infer states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 1204 can provide various types of user interfaces to facilitate interaction between a user and any component coupled to the destination estimator component 104. As depicted, the presentation component 1204 is a separate entity that can be utilized with the destination estimator component 104. However, it is to be appreciated that the presentation component 1204 and/or similar view components can be incorporated into the destination estimator component 104 (and/or the interface component 102) and/or a stand-alone unit. The presentation component 1204 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the destination estimator component 104.

The user can also interact with the regions to select and provide information by way of various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., by way of a text message on a display and an audio tone) the user for information by way of providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 13:
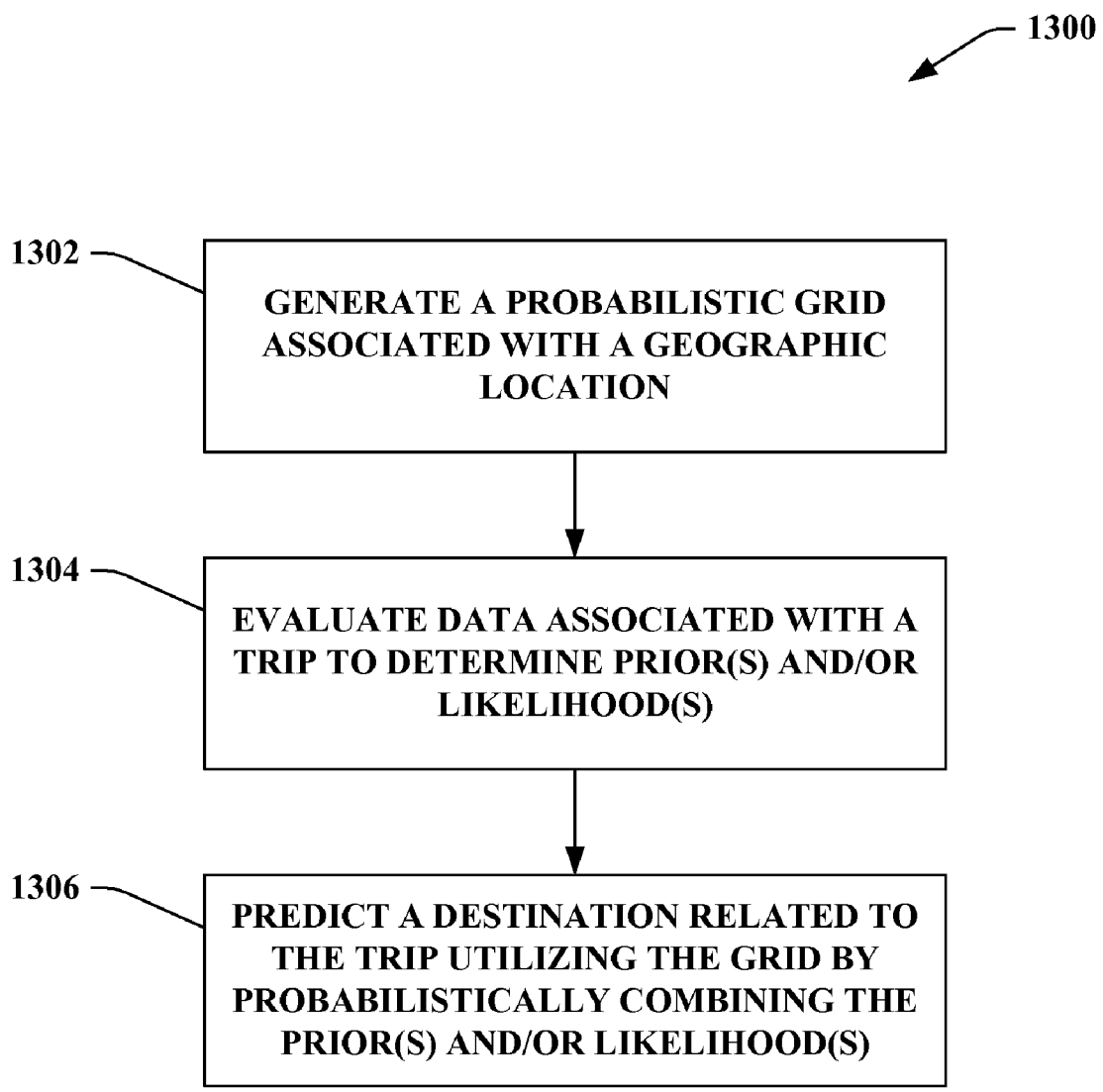
FIG. 13 illustrates an exemplary methodology that facilitates probabilistically predicting destination(s).
Figure 14:
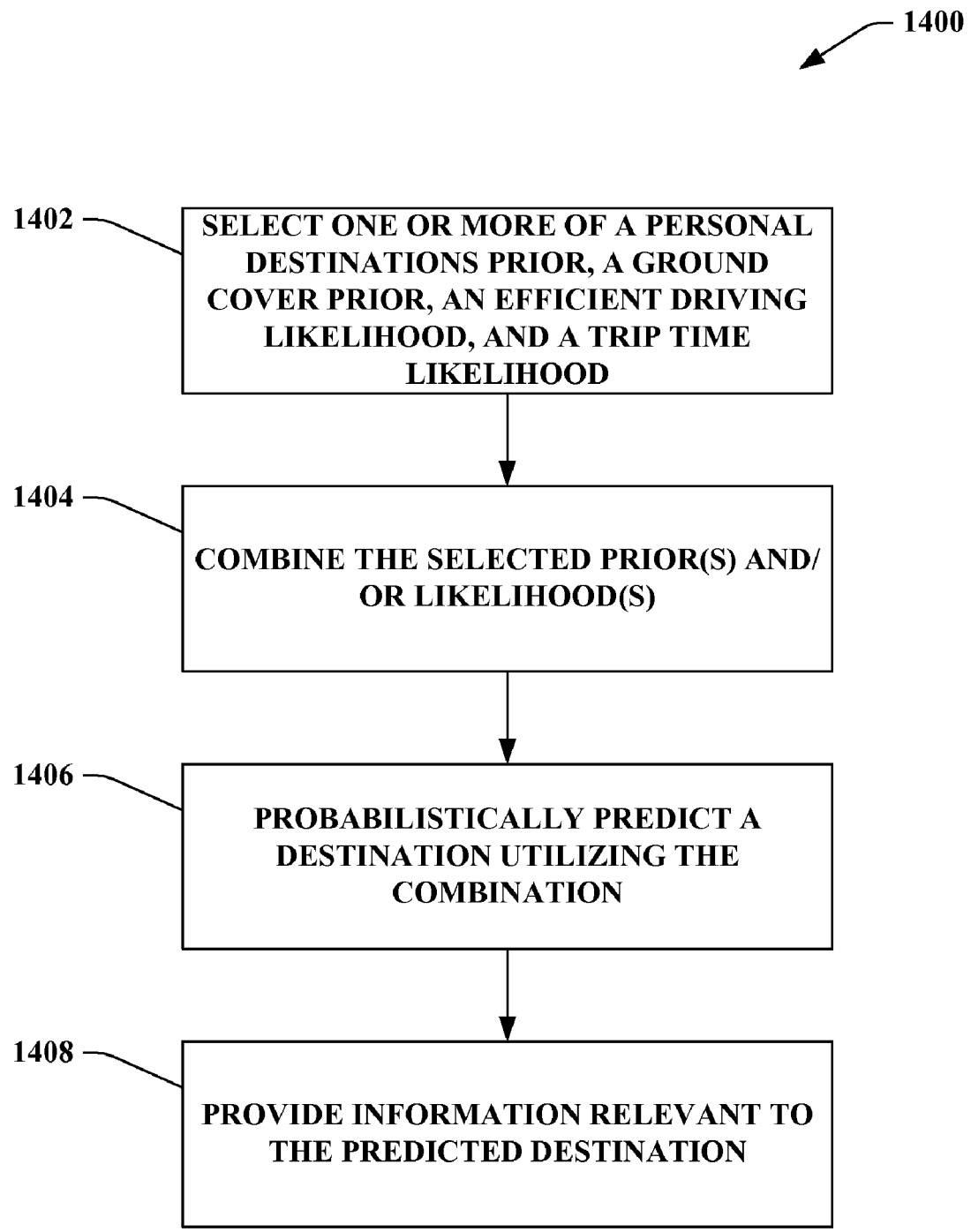
FIG. 14 illustrates an exemplary methodology that provides information relevant to a destination that can be predicted based upon prior(s) and/or likelihood(s) that can be combined.

FIGS. 13-14 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 13, illustrated is a methodology 1300 that facilitates probabilistically predicting destination(s). At 1302, a probabilistic grid associated with a geographic location can be generated. It is contemplated that the geographic location can be any size. For example, the geographic location can be associated with a city, a county, any number of city blocks, a state, a country, and the like. Additionally, the grid can include any number of cells and the cells can be any size, shape, etc.

At 1304, data associated with a trip can be evaluated to determine prior(s) and/or likelihood(s). For example, the evaluated data can be ground cover data, historical data, efficient route data, trip time distribution data, real time location data related to a current trip, etc. The data, for instance, can be obtained from any source. Further, by way of illustration, the real time location data related to the current trip can be considered when determining a prior or a likelihood. Alternatively, a prior or a likelihood can be identified without utilizing the real time location data. At 1306, a destination related to the trip can be predicted utilizing the grid by probabilistically combining the prior(s) and/or likelihood(s). One or more priors and/or one or more likelihoods can be selected to be combined. Thus, according to an example, a ground cover prior and a trip time likelihood can be selected to be employed to predict the destination; however, the claimed subject matter is not limited to such example. The combination of prior(s) and/or likelihood(s) can then be employed to generate the predicted destination.

Referring to FIG. 14, illustrated is a methodology 1400 that provides information relevant to a destination that can be predicted based upon prior(s) and/or likelihood(s) that can be combined. At 1402, one or more of a personal destinations prior, a ground cover prior, an efficient driving likelihood, and a trip time likelihood can be selected. For example, the personal destinations prior can be based on a set of a user's previous destinations (e.g., historical data). Further, the ground cover prior can be associated with a probability that a cell within a probabilistic grid related to a geographic location is a destination based on a ground cover within the cell. Additionally, the efficient driving likelihood can be based on a change in time until an arrival at a candidate destination. Thus, routes between pairs of cells can be evaluated in connection with the efficient driving likelihood. The trip time likelihood, for instance, can be related to an elapsed trip time and/or trip time distribution data.

At 1404, the selected prior(s) and/or likelihood(s) can be combined. For example, Bayes rule can be utilized in connection with combining the selected prior(s) and/or likelihood(s). At 1406, a destination can be probabilistically predicted utilizing the combination. Thus, for example, a particular cell from the probabilistic grid can be identified as the destination. At 1408, information that is relevant to the predicted destination can be provided. For instance, the information can relate to the destination and/or a location along a route to the destination. By way of further illustration, the relevant information can be traffic related, weather related, associated with targeted advertising, related to providing navigational assistance, associated with an event potentially of interest, etc.

Figure 15:
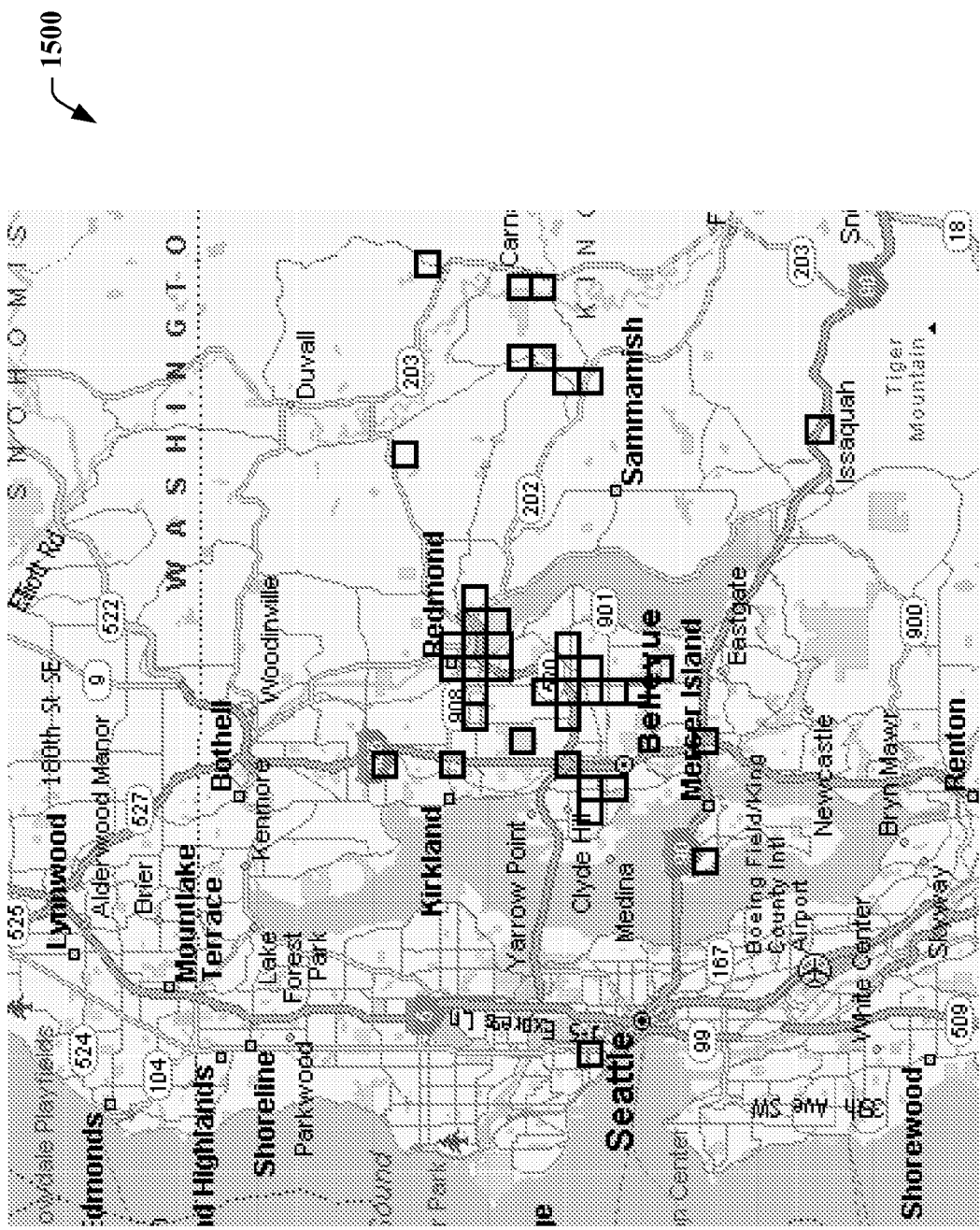
FIGS. 15-18 illustrate exemplary grids and corresponding maps depicting various aspects in association with modeling driver behavior and destination predictions.
Figure 16:
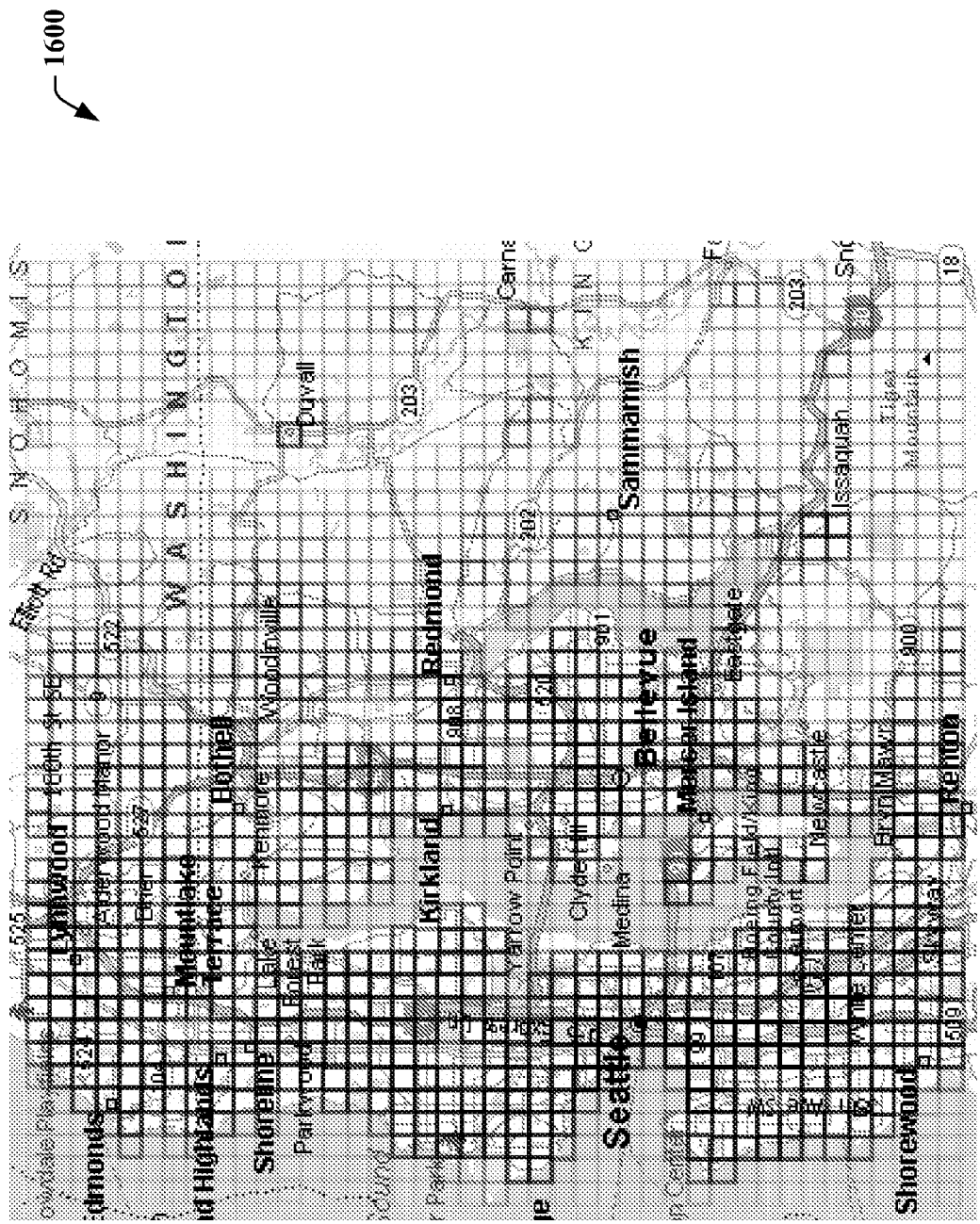
Figure 17:
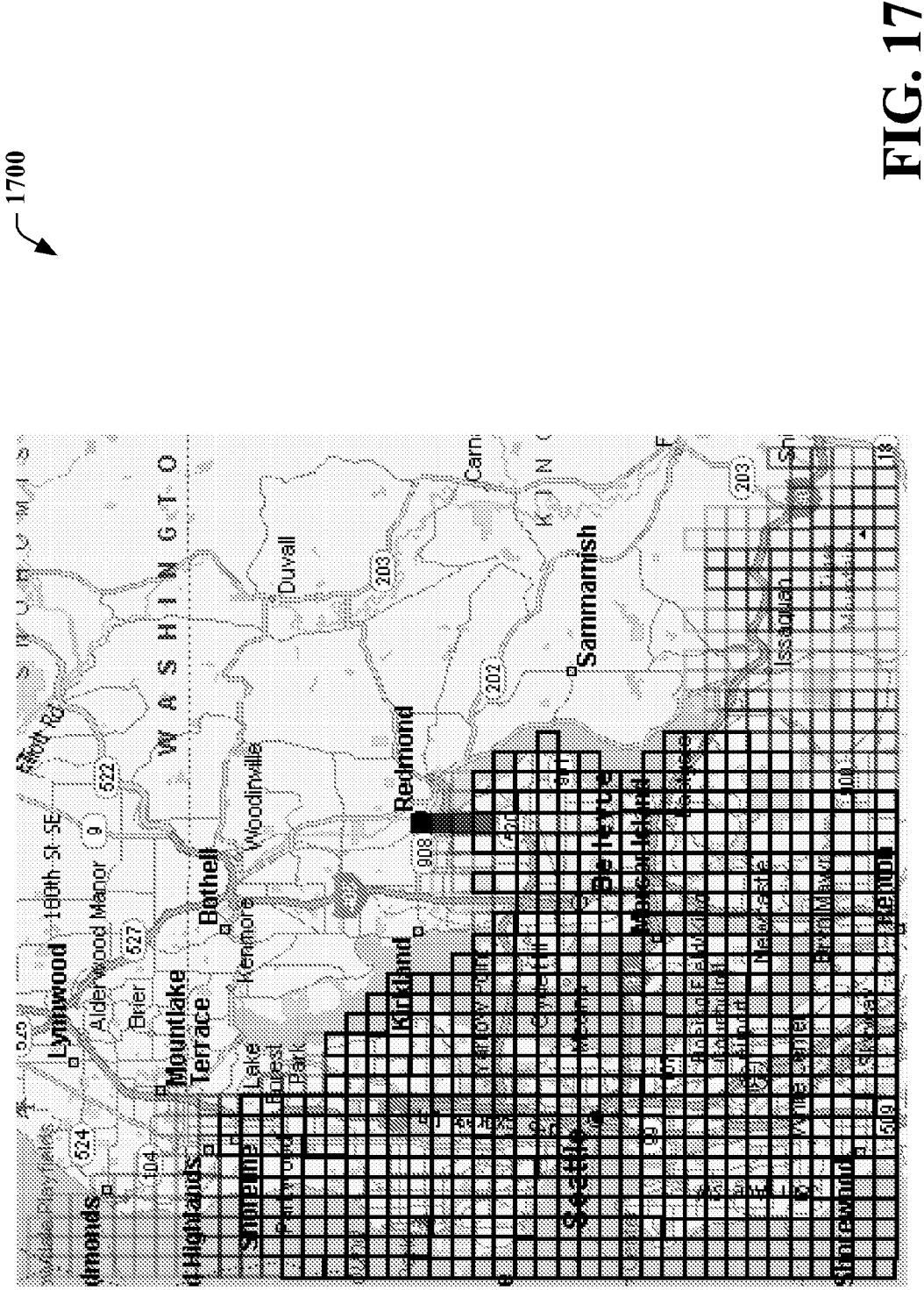
Figure 18:
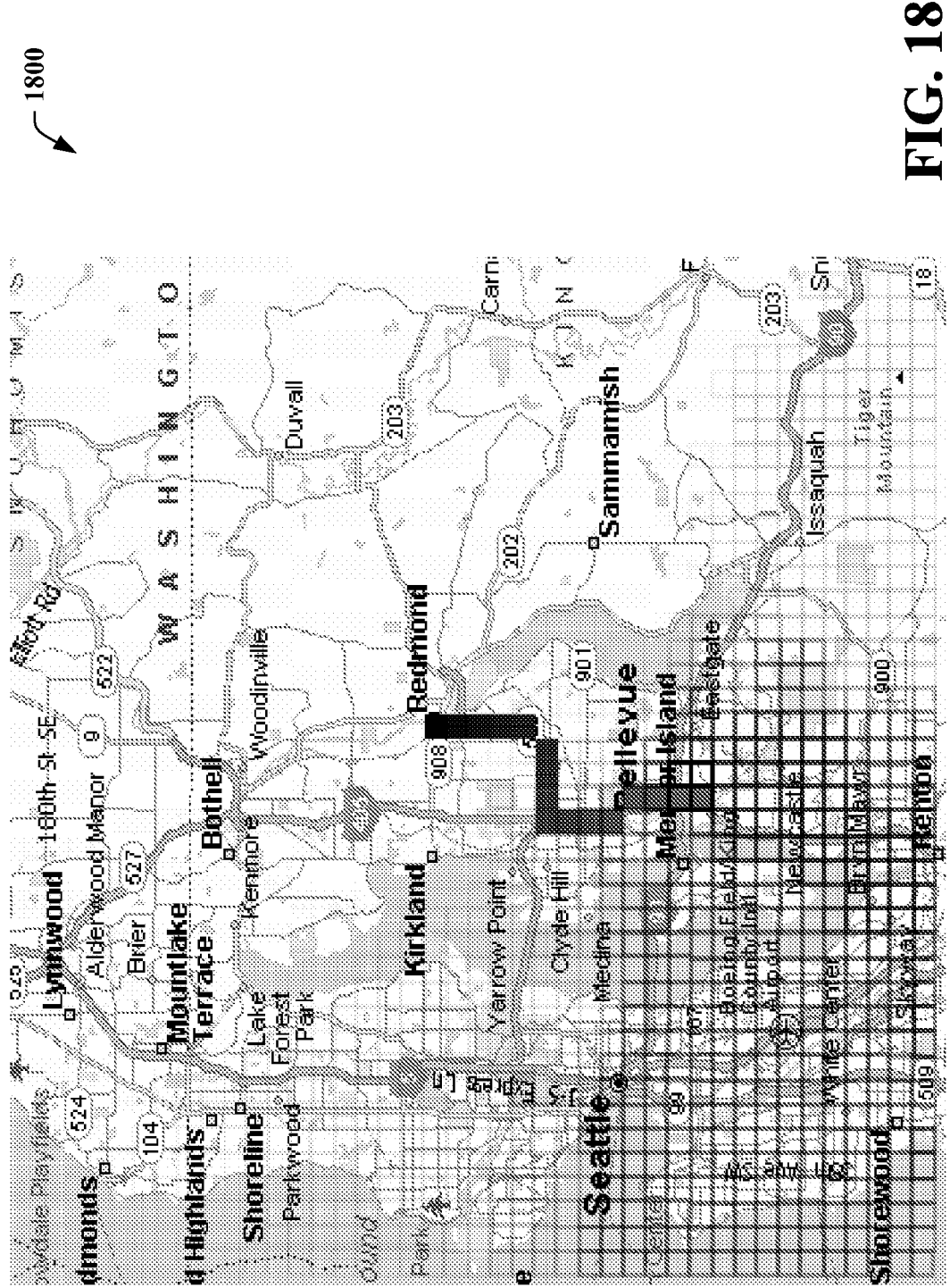

FIGS. 15-18 illustrate exemplary grids and corresponding maps depicting various aspects in association with modeling driver behavior and destination predictions. It is to be appreciated that these grids and maps are provided as examples and the claimed subject matter is not so limited. With reference to FIG. 15, illustrated is a grid 1500 depicting destination cells associated with a personal destinations prior related to a particular user. Turning to FIG. 16, depicted is a grid 1600 that demonstrates a ground cover prior, where darker outlines show higher probability destination cells. FIG. 17 illustrates a grid 1700 related to an efficient driving likelihood; in particular, the grid 1700 illustrates that after traveling four cells in a southern direction, much of the northeastern section can be removed. Further, FIG. 18 depicts a grid 1800 where the user continues to travel further south and additional cells can be removed from the grid 1800 as compared to the grid 1700.

Figure 19:
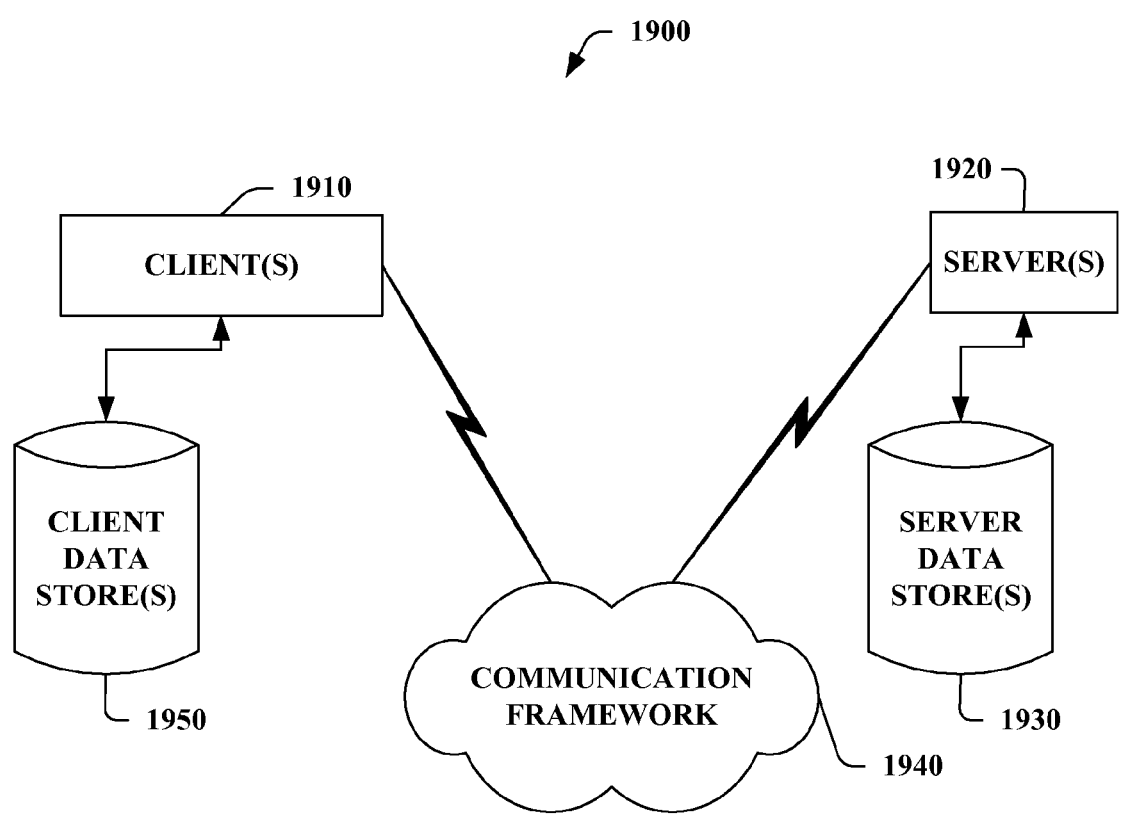
FIG. 19 illustrates an exemplary networking environment, wherein the novel aspects of the claimed subject matter can be employed.
Figure 20:
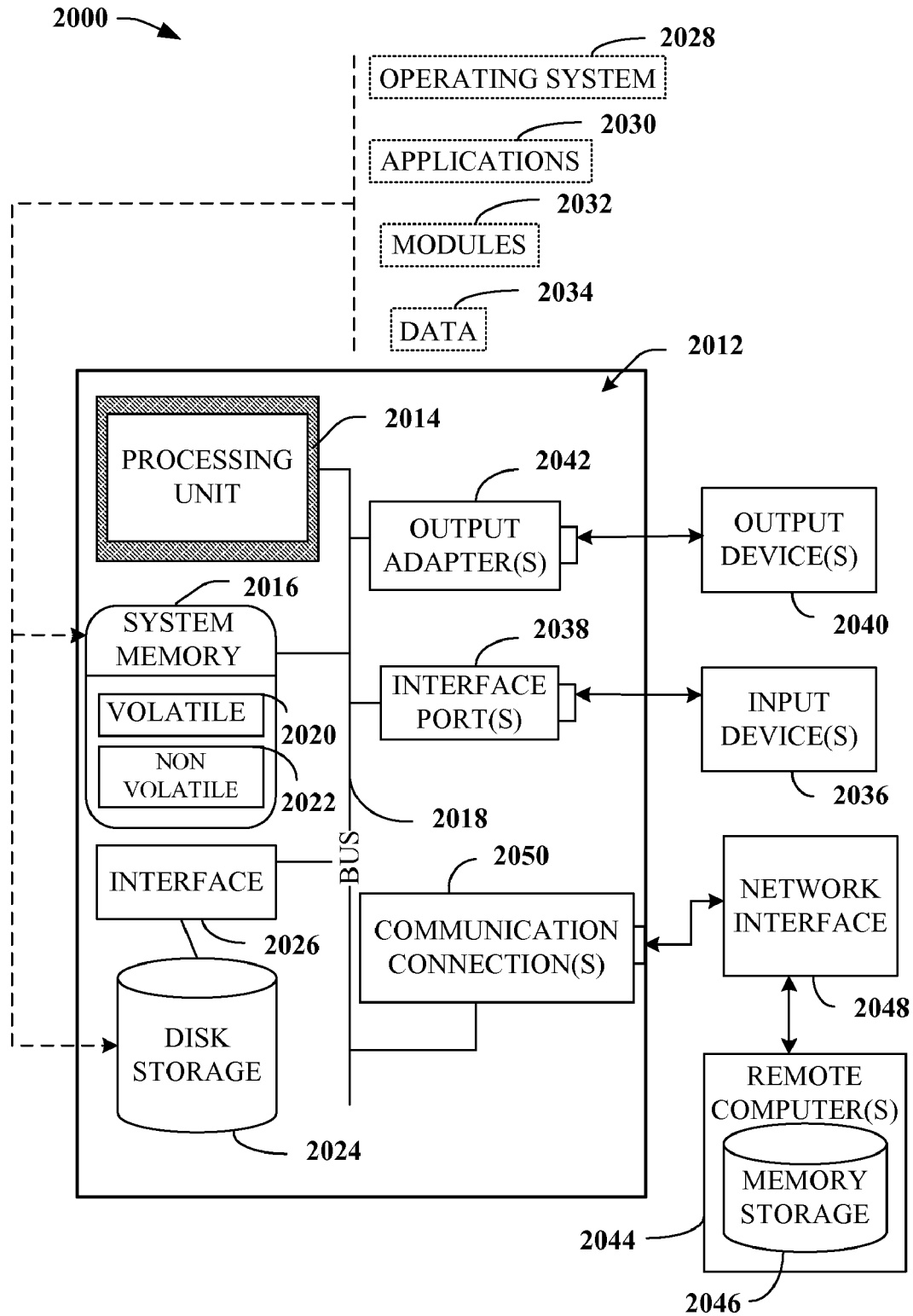
FIG. 20 illustrates an exemplary operating environment that can be employed in accordance with the claimed subject matter.

In order to provide additional context for implementing various aspects of the claimed subject matter, FIGS. 19-20 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 19 is a schematic block diagram of a sample-computing environment 1900 with which the claimed subject matter can interact. The system 1900 includes one or more client(s) 1910. The client(s) 1910 can be hardware and/or software (e.g., threads, processes, computing devices). The system 1900 also includes one or more server(s) 1920. The server(s) 1920 can be hardware and/or software (e.g., threads, processes, computing devices). The servers 1920 can house threads to perform transformations by employing the subject innovation, for example.

One possible communication between a client 1910 and a server 1920 can be in the form of a data packet adapted to be transmitted between two or more computer processes. The system 1900 includes a communication framework 1940 that can be employed to facilitate communications between the client(s) 1910 and the server(s) 1920. The client(s) 1910 are operably connected to one or more client data store(s) 1950 that can be employed to store information local to the client(s) 1910. Similarly, the server(s) 1920 are operably connected to one or more server data store(s) 1930 that can be employed to store information local to the servers 1920.

With reference to FIG. 20, an exemplary environment 2000 for implementing various aspects of the claimed subject matter includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable programmable ROM (EEPROM), or flash memory. Volatile memory 2020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2012 also includes removable/non-removable, volatile/non-volatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in the suitable operating environment 2000. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the claimed subject matter can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers, among other output devices 2040, which require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates determining one or more destinations of a user, comprising:
   at least one processor;
   an interface component that, when executed by the at least one processor, receives input data about the user, the user data indicating at least one of: the user's specialized knowledge or historical driving efficiencies or historical driving times; and
   a destination estimator component that, when executed by the at least one processor is configured to:
   determine travel data during a trip;
   determine a likelihood for each of a plurality of candidate destinations based at least in part on the received input data about the user and the travel data, the likelihood indicating, for each of the plurality of candidate destinations, a likelihood that the candidate destination is the destination of the trip, the likelihood being an efficient driving likelihood based on an estimated time until an arrival at a candidate destination, the efficient driving likelihood being related to a computed driving efficiency associated with a set of candidate destinations that provide evidence about a final location; and
   predict one or more destinations for the trip based on the likelihoods for the plurality of candidate destinations.

2. A system that facilitates determining one or more destinations of a user on a trip, comprising:
   at least one computer storage medium comprising computer executable instructions that, when executed by a processor:
   receive input data associated with at least one of one or more priors and one or more likelihoods; and
   predict one or more destinations based on a combination of at least one of the one or more priors and at least one of the one or more likelihoods, each of the one or more priors indicating a probability that a location is a destination of the trip based on prior activity by the user in visiting locations, and each of the one or more likelihoods indicating a probability that a location is the destination of the trip based on trip data, each of the one or more likelihoods being a trip time likelihood based at least in part on an estimated time to the location and an elapsed trip time.

3. A system that facilitates determining one or more destinations of a user, comprising:
   at least one processor;
   an interface component comprising computer-executable instructions that, when executed by a processor of the at least one processor, receives input data from at least one sensor; and
   a destination estimator component comprising computer-executable instructions that, when executed by a processor of the at least one processor, probabilistically predicts one or more candidate destinations is a destination for a trip based on at least one prior and at least one likelihood based at least in part on the received input data, wherein:

the received input data comprises an indication of an amount of time that a user has been traveling for a trip;

the likelihood is an efficient driving likelihood, the efficient driving likelihood being related to a computed driving efficiency associated with the set of candidate destinations, the computed driving efficiency being based on a ratio between how much time the user should have spent moving toward the candidate destination, if the user were following an efficient route to the candidate destination, and how much time that the user has actually been traveling for the trip; and each of the one or more priors indicates a probability that a location is a destination of the trip based on activity by the user in visiting prior locations.

4. The system of claim 3, wherein:
the destination estimator component predicts the destination of the trip based on a time difference between a time to follow the efficient route to the candidate destination and an estimated time to drive from a current location to the candidate destination.

5. The system of claim 1, wherein:
the received input data comprises an indication of an amount of time that a user has been traveling for the trip; and
the destination estimator component predicts the destination of the trip based on a likelihood that is based at least in part on an estimated time to a candidate destination of the set of candidate destinations and the amount of time that the user has been traveling for the trip.

6. The system of claim 1, wherein the destination estimator component utilizes Bayes rule to probabilistically predict the one or more destinations.

7. The system of claim 1, further comprising a fusing component that enables selecting at least one of a personal destinations prior, a ground cover prior, an efficient driving likelihood, and a trip time likelihood to combine to probabilistically predict the one or more destinations.

8. The system of claim 1, further comprising a content component that provides relevant information associated with the one or more predicted destinations, the content component provides at least one of warnings of traffic, construction, safety issues ahead, advertisements being displayed, directions, routing advice, and updates.

9. The system of claim 8, further comprising a customization component that tailors the relevant information provided by the content component based on user related preferences.

10. The system of claim 1, wherein the destination estimator component predicts the one or more destinations during travel utilizing real time location data.

11. The system of claim 1, further comprising a grid component that generates a probabilistic grid associated with a map of a geographic location that is employed by the destination estimator component to predict the one or more destinations.

12. The system of claim 1, further comprising a route planning component that generates routes likely to be utilized to travel to candidate destinations and determines time estimates associated with the routes.

13. The system of claim 1, wherein the destination estimator component integrates open world and closed analyses into a location forecast, where the destination estimator component performs forecasting about a likelihood of a driver visiting a previously unobserved location and spatial relationships of new locations, given prior observations of locations.

14. The system of claim 1, wherein
the system further comprises:
a component that, when executed by a processor of the at least one processor, generates a probabilistic grid associated with a geographic location;
a component that, when executed by a processor of the at least one processor, evaluates a prior, the prior indicating a probability that a candidate destination is a destination of the trip based on information available prior to the trip; and
the destination estimator component predicts the one or more destinations related to the trip utilizing the grid by probabilistically combining the one or more of the prior and the likelihood.

15. The system of claim 14, further comprising a component that, when executed by a processor of the at least one processor, generates the likelihood based on one or more of a change in time until an arrival at a candidate destination and an elapsed trip time.

16. The system of claim 14, wherein the destination estimator component predicts the one or more destinations as the trip is in progress.

17. The system of claim 14, further comprising a component that, when executed by a processor of the at least one processor, generates the prior based on one or more of a set of a user's previous destinations and a probability that a cell is the destination based on ground cover within the cell.

* * * * *